(12) United States Patent
Saito

(10) Patent No.: US 9,714,015 B2
(45) Date of Patent: Jul. 25, 2017

(54) BRAKING CONTROL DEVICE FOR VEHICLE

(71) Applicant: ADVICS CO., LTD., Kariya-shi, Aichi-ken (JP)

(72) Inventor: Hiroki Saito, Obu (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/909,019

(22) PCT Filed: Jul. 31, 2014

(86) PCT No.: PCT/JP2014/070176
§ 371 (c)(1),
(2) Date: Jan. 29, 2016

(87) PCT Pub. No.: WO2015/016300
PCT Pub. Date: Feb. 5, 2015

(65) Prior Publication Data
US 2016/0200298 A1    Jul. 14, 2016

(30) Foreign Application Priority Data

Jul. 31, 2013 (JP) ................................ 2013-159598

(51) Int. Cl.
*B60T 8/17* (2006.01)
*B60T 8/36* (2006.01)

(52) U.S. Cl.
CPC ... *B60T 8/17* (2013.01); *B60T 8/36* (2013.01); *B60T 8/3655* (2013.01)

(58) Field of Classification Search
CPC ............. B60T 8/17; B60T 8/36; B60T 8/3655
(Continued)

(56) References Cited

U.S. PATENT DOCUMENTS

| 4,824,189 A * | 4/1989 | Burgdorf .................. B60T 8/26 303/113.2 |
| 6,010,198 A * | 1/2000 | Nakazawa ............. B60T 8/404 303/10 |

(Continued)

FOREIGN PATENT DOCUMENTS

| JP | 2000-127929 A | 5/2000 |
| JP | 2012-224318 A | 11/2012 |
| JP | 2013-047033 A | 3/2013 |

OTHER PUBLICATIONS

International Search Report (PCT/ISA/210) issued on Oct. 7, 2014, by the Japanese Patent Office as the International Searching Authority for International Application No. PCT/JP2014/070176.
(Continued)

*Primary Examiner* — Tyler J Lee
(74) *Attorney, Agent, or Firm* — Buchanan Ingersoll & Rooney PC

(57) ABSTRACT

A vehicle braking control device includes: an indicated-value-setting unit for setting an indicated current value, which relates to a differential pressure valve provided to a channel between a master cylinder and a wheel cylinder, to a value corresponding to a required differential pressure; and a depressurization-starting differential pressure acquisition unit for acquiring, as a depressurization-starting differential pressure, the differential pressure at the point in time when a pressurizing state for increasing the differential pressure caused by the differential pressure valve transitions to a depressurizing state for reducing the differential pressure caused by the differential pressure valve. The area between the depressurization-starting differential pressure and a boundary differential pressure is set as a depressurization-starting differential pressure area. When the depressurizing state is in effect and the required differential pressure is included in the depressurization-starting differential pres-
(Continued)

sure area, the indicated-value-setting unit sets the slope of decrease of the indicated current value.

18 Claims, 13 Drawing Sheets

(58) Field of Classification Search
USPC .................................................. 701/70–98
See application file for complete search history.

(56) References Cited

U.S. PATENT DOCUMENTS

| | | | | |
|---|---|---|---|---|
| 7,530,648 B2* | 5/2009 | Obai | .................. | B60T 8/17616 |
| | | | | 303/119.1 |
| 8,342,616 B2* | 1/2013 | Sawada | ................. | B60T 8/1764 |
| | | | | 303/113.2 |

OTHER PUBLICATIONS

Written Opinion (PCT/ISA/237) issued on Oct. 7, 2014, by the Japanese Patent Office as the International Searching Authority for International Application No. PCT/JP2014/070176.

* cited by examiner

| Differential pressure area | 23rd differential pressure area R23 | 22nd differential pressure area R22 | 21nd differential pressure area R21 |
|---|---|---|---|
| Reference slope of decrease DDZB | DDZB3 | DDZB2 | DDZB1 |

⇒ Higher pressures

FIG.13B

S11: Calculate actual differential pressure X
S12: Depressurization determination flag FLG1 = OFF
    and Pressurization determination flag FLG2 = ON?
S13: Minimum hold value H_min ← Initial value H_minA
S14: Maximum hold value H_max ← MAX(H_max , X)
S15: Differential pressure decrease amount $\Delta$X1 = H_max − X
S16: $\Delta$X1 $\geqq$ Decrease determination value $\Delta$X1_Th?
S17: FLG1 ← ON  FLG2 ← OFF
S18: Store depressurization-starting differential pressure XD
S19: H_max ← Initial value H_maxA
S20: H_min ← MIN(H_min , X)
S21: Differential pressure increase amount $\Delta$X2 = X − H_min
S22: $\Delta$X2 $\geqq$ Increase determination value $\Delta$X2_Th?
S23: FLG1 ← ON  FLG2 ← OFF
S24: Store pressurization-starting differential pressure XI

FIG.14B

S31: FLG1 is on?
S32: Differential pressure variation amount $\Delta XB$
    = depressurization-starting differential pressure XD − actual differential pressure X
S33: Read out brake fluid discharge amount Y and temperature TMP
S34: Calculation of corrected slope of increase DRI
S35: Correction amount $Z = DRI \cdot \Delta XB$
S36: Acquire limiting value Z_Lim
S37: $Z \geqq Z\_Lim$?
S38: $Z \leftarrow Z\_Lim$
S39: Differential pressure variation amount $\Delta XA$
    = actual differential pressure X− Pressurization-starting differential pressure XI
S40: Read out brake fluid discharge amount Y and temperature TMP
S41: Calculation of corrected slope of decrease DRD
S42: Read out correction amount ZA at depressurization end
S43: $Z = ZA - DRD \cdot \Delta XA$
S44: $Z \leqq 0$ (zero)?
S45: $Z \leftarrow 0$ (zero)
S46: Corrected required differential pressure MZ = required differential pressure M − Z
S47: Calculate indicated current value Ip

BRAKING CONTROL DEVICE FOR VEHICLE

TECHNICAL FIELD

The present invention relates to a braking control device for vehicle configured to control a differential pressure valve to be driven to adjust a differential pressure between a master cylinder and a wheel cylinder.

BACKGROUND ART

There is provided, between a master cylinder operated in accordance with driver's brake operation and a wheel cylinder corresponding to a wheel, a brake actuator configured to adjust a fluid pressure in the wheel cylinder to control braking torque to the wheel. Such an actuator includes a differential pressure valve as an electromagnetic linear valve configured to be driven to adjust a differential pressure between the master cylinder and the wheel cylinder, and a pump connected to a passage between the differential pressure valve and the wheel cylinder. When a value of driving current flowing to the differential pressure valve increases in a state where the pump discharges brake fluid, the differential pressure valve decreases in opening degree whereas the differential pressure, i.e. the fluid pressure in the wheel cylinder, increases. In contrast, when the driving current value decreases in the state where the pump discharges brake fluid, the differential pressure valve increases in opening degree whereas the differential pressure, i.e. the fluid pressure in the wheel cylinder, decreases.

As depicted in FIG. 16, the differential pressure valve has a hysteresis that a differential pressure actually generated between the master cylinder and the wheel cylinder (hereinafter, also referred to as an "actual differential pressure") differs from each other between the case where the driving current value is increased and the case where the driving current value is decreased. Specifically, assume that an indicated current value is set to a predetermined current value A1 according to a required differential pressure PR when the actual differential pressure is increased to the required differential pressure PR. When the value of the driving current flowing to the differential pressure valve increases and reaches the predetermined current value A1 in this case, the actual differential pressure is increased to be approximate to the required differential pressure PR. However, when the actual differential pressure is decreased to the required differential pressure PR, the actual differential pressure is not decreased sufficiently and causes a difference between the actual differential pressure and the required differential pressure PR even if the driving current value decreases and reaches the predetermined current value A1. Note that the difference between the actual differential pressure of the case where a driving current value Id increases and reaches the predetermined current value A1 (the required differential pressure PR in this case) and the actual differential pressure of the case where the driving current value Id decreases and reaches the predetermined current value A1 will be also referred to as a "hysteresis amount HY".

In this regard, a braking control device disclosed in Patent Literature 1 is configured to correct an indicated current value with a predetermined value according to the hysteresis and control a differential pressure valve in accordance with the indicated current value thus corrected when a differential pressure larger than a required differential pressure is decreased to the required differential pressure.

CITATIONS LIST

Patent Literature

Patent Literature 1: JP 2000-127929 A

SUMMARY OF INVENTION

Technical Problems

There have been recently various demands to a brake actuator, such as automatic braking or automatic speed adjustment. In order to satisfy these demands, braking torque to a wheel, i.e. a differential pressure between a master cylinder and a wheel cylinder, is required to be controlled more accurately.

It is an object of the present invention to provide a braking control device for vehicle configured to accurately control a differential pressure between a master cylinder and a wheel cylinder.

Solutions to Problems

A braking control device for vehicle made in order to achieve the object mentioned above includes: an indicated-value-setting unit configured to set an indicated current value to a differential pressure valve provided at a channel between a master cylinder and a wheel cylinder corresponding to a wheel, to a value according to a required differential pressure having a requirement value of a differential pressure by the differential pressure valve; and a depressurization-starting differential pressure acquisition unit configured to acquire, as a depressurization-starting differential pressure, a differential pressure at transition from a pressurizing state of increasing the differential pressure by the differential pressure valve to a depressurizing state of decreasing the differential pressure by the differential pressure valve. Assume that a depressurizing differential pressure area is set as an area between the depressurization-starting differential pressure acquired by the depressurization-starting differential pressure acquisition unit and a boundary differential pressure having a value obtained by subtracting "a predetermined differential pressure according to the depressurization-starting differential pressure" from "the depressurization-starting differential pressure". In this case, the indicated-value-setting unit sets a slope of decrease of the indicated current value, as an amount of decrease of the indicated current value relative to an amount of decrease of the required differential pressure, to be gentler as the depressurization-starting differential pressure is smaller, when the required differential pressure is included in the depressurizing differential pressure area in the depressurizing state.

Assume that, in the state where a value of driving current flowing to the differential pressure valve is increased and the differential pressure is thus equal to a first differential pressure, the required differential pressure is set to a second differential pressure smaller than the first differential pressure. The indicated current value is decreased from a value according to the first differential pressure in this case. In order to decrease the differential pressure to the required differential pressure (i.e. the second differential pressure), the driving current value is decreased along with the indicated current value thus changed. The differential pressure by the differential pressure valve is thus decreased. A "driving current value" herein has a value of current actually flowing to a differential pressure valve, or a value corresponding to the value of the actually flowing current.

With the transition from the pressurizing state to the depressurizing state, acquired as the depressurization-starting differential pressure in the above configuration is the differential pressure at the time point of detection of the transition from the pressurizing state to the depressurizing state, i.e. the time point when the differential pressure starts decreasing. When satisfying both the depressurizing state and the state where the required differential pressure (i.e. the second differential pressure) is included in the depressurizing differential pressure area, the slope of decrease of the indicated current value, i.e. the amount of decrease of the indicated current value relative to the amount of decrease of the required differential pressure, is made gentler as the depressurization-starting differential pressure is smaller, and the indicated current value is decreased with the slope of decrease.

If the required differential pressure is equivalent, the rate of decrease of the differential pressure relative to decrease of the driving current value is likely to be lower as the depressurization-starting differential pressure is larger at an initial stage where the driving current value starts decreasing from the indicated current value according to the first differential pressure. Specifically, at the initial stage, the rate of increase of a hysteresis amount, i.e. the difference between the differential pressure at the driving current value increased to the indicated current value and the differential pressure at the driving current value decreased to the indicated current value, is likely to be higher as the depressurization-starting differential pressure is larger. After a while from the start of decrease of the driving current value, the rate of decrease of the differential pressure gradually increases whereas the slope of increase of the hysteresis amount gradually becomes gentler. If the driving current value further decreases subsequently, the rate of decrease of the differential pressure relative to decrease of the driving current value increases rapidly, in other words, the hysteresis amount decreases.

The initial stage, where the rate of increase of the hysteresis amount varies in accordance with the level of the depressurization-starting differential pressure, corresponds to the depressurizing differential pressure area. Accordingly, the depressurization-starting differential pressure corresponds to an upper limit value in the depressurizing differential pressure area whereas the boundary differential pressure corresponds to a lower limit value in the depressurizing differential pressure area.

By more steeply decreasing the indicated current value as the depressurization-starting differential pressure is larger as described above in the depressurizing state, the driving current value is likely to decrease even when the depressurization-starting differential pressure is large and the rate of decrease of the differential pressure relative to decrease of the driving current value is low. The differential pressure can thus be decreased sufficiently. The differential pressure can accordingly be decreased to the required differential pressure. In contrast, if the depressurization-starting differential pressure is small and the rate of decrease of the differential pressure relative to decrease of the driving current value is comparatively high, the indicated current value is decreased with a gentler slope than that of the case where the depressurization-starting differential pressure is large. The driving current value is thus restrained from becoming too small so as to restrain the phenomenon that the differential pressure is much smaller than the required differential pressure.

However, as described above, if the required differential pressure (i.e. the second differential pressure) is smaller than the boundary differential pressure having the lower limit value in the depressurizing differential pressure area, the rate of decrease of the differential pressure relative to decrease of the driving current value gradually increases after a while from the start of decrease of the driving current value along with decrease of the indicated current value. Specifically, the state of a large amount of decrease of the indicated current value relative to decrease of the required differential pressure transitions to the state of a small amount of decrease due to the hysteresis property of the differential pressure valve. Even in the case where the rate of decrease of the differential pressure increases in this manner, if the indicated current value is decreased with the slope of decrease of the indicated current value according to the depressurization-starting differential pressure, the indicated current value may become too small and the differential pressure may become much smaller than the required differential pressure (i.e. the second differential pressure). In view of this, the above configuration allows the indicated current value to be decreased with the slope of decrease of the indicated current value according to the depressurization-starting differential pressure only in a case where the required differential pressure (i.e. the second differential pressure) is included in the depressurizing differential pressure area in the depressurizing state. This can restrain the phenomenon that the differential pressure is much smaller than the required differential pressure (i.e. the second differential pressure).

This achieves accurate control of the differential pressure between the master cylinder and the wheel cylinder.

When the indicated current value according to the required differential pressure is set as a reference indicated current value, the braking control device for vehicle may include a depressurizing correction amount setting unit configured to set a correction amount referred to for correction of the indicated current value in the depressurizing state. The indicated-value-setting unit preferably sets the indicated current value in accordance with a value obtained by subtracting the correction amount set by the depressurizing correction amount setting unit from the reference indicated current value in the depressurizing state. In this case, preferably, the depressurizing correction amount setting unit sets a slope of increase of the correction amount, as an amount of increase of the correction amount relative to the amount of decrease of the required differential pressure, to be gentler as the depressurization-starting differential pressure is smaller and increases the correction amount with the slope of increase, when the required differential pressure is included in the depressurizing differential pressure area in the depressurizing state. Preferably, in a case where the required differential pressure is smaller than a lower limit value in the depressurizing differential pressure area in the depressurizing state, the depressurizing correction amount setting unit sets the slope of increase of the correction amount to be gentler as the depressurization-starting differential pressure is smaller and increases the correction amount with the slope of increase when the differential pressure by the differential pressure valve decreases in the depressurizing differential pressure area, and sets the correction amount to be equal to a limiting value when the differential pressure by the differential pressure valve decreases beyond the depressurizing differential pressure area.

In the above configuration, when the required differential pressure is included in the depressurizing differential pressure area in the depressurizing state, the slope of increase of the correction amount is made gentler as the depressurization-starting differential pressure is smaller and the correction amount is increased with the slope of increase. When the required differential pressure (i.e. the second differential pressure) is included in the depressurizing differential pressure area, the indicated current value is set by subtracting the correction amount from the reference indicated current value as the indicated current value according to the required differential pressure, so as to achieve the configuration that allows the indicated current value to be decreased with the slope of decrease of the indicated current value according to the depressurization-starting differential pressure.

The required differential pressure (i.e. the second differential pressure) is occasionally smaller than the lower limit value in the depressurizing differential pressure area. In a state where the differential pressure by the differential pressure valve decreases in the depressurizing differential pressure area in this case, the slope of increase of the correction amount is made gentler as the depressurization-starting differential pressure is smaller and the correction amount is increased with the slope of increase. When the differential pressure by the differential pressure valve decreases to become less than the lower limit value in the depressurizing differential pressure area, the correction amount is made equal to the limiting value. The indicated current value is restrained from becoming too low by restraining the correction amount from becoming too large. This can restrain the phenomenon that the value of the driving current flowing to the differential pressure valve is too small and the differential pressure by the differential pressure valve is much smaller than the required differential pressure. It is thus possible to restrain the phenomenon that the differential pressure is much smaller than the required differential pressure (i.e. the second differential pressure).

The braking control device for vehicle may include a storage unit configured to store a property indicating relation between a driving current value and the differential pressure of a case of increasing the value of driving current. In this case, the indicated-value-setting unit preferably sets the reference indicated current value to be larger as the required differential pressure is larger in accordance with the property stored in the storage unit. When the required differential pressure is changed, this configuration allows the reference indicated current value to be set to the indicated current value according to the required differential pressure thus changed, based on the above property. The differential pressure can be controlled appropriately by decreasing the indicated current value from the reference indicated current value with the slope of decrease of the indicated current value according to the depressurization-starting differential pressure.

When the differential pressure is small, the rate of decrease of the differential pressure relative to decrease of the driving current value is high. Accordingly, the rate of decrease of the hysteresis amount relative to decrease of the driving current value is high. Preferably, the limiting value is set as an upper limit value when the differential pressure by the differential pressure valve is not less than a specified differential pressure because the rate of decrease of the differential pressure relative to decrease of the driving current value is low, and the limiting value is made smaller as the differential pressure by the differential pressure valve is smaller when the differential pressure by the differential pressure valve is less than the specified differential pressure because the rate of decrease of the differential pressure relative to decrease of the driving current value is high. This configuration can set the limiting value to an appropriate value according to the differential pressure by the differential pressure valve at the timing and can restrain the indicated current value from becoming too small. This can restrain the phenomenon that the differential pressure is much smaller than the required differential pressure.

In the braking control device for vehicle, the indicated-value-setting unit can be configured to set the slope of decrease of the indicated current value in accordance with a differential pressure area. In this case, a slope of decrease of the indicated current value of a case where the depressurization-starting differential pressure is included in a first differential pressure area is preferably gentler than a slope of decrease of the indicated current value of a case where the depressurization-starting differential pressure is included in a second differential pressure area as a higher pressure area than the first differential pressure area. This configuration can restrain increase of a control load of the braking control device in comparison to a case where each depressurization-starting differential pressure has its own slope.

When the differential pressure is decreased, the variation manner of the hysteresis amount can be influenced also by a flow rate of brake fluid in the channel provided with the differential pressure valve. In view of this, the indicated-value-setting unit preferably corrects the slope of decrease of the indicated current value in accordance with a flow rate of brake fluid in the channel. At a flow rate that is likely to increase the hysteresis amount, when the slope of decrease of the indicated current value according to the depressurization-starting differential pressure is corrected to be steeper, the indicated current value can be set appropriately and the differential pressure can thus be decreased appropriately. At a flow rate that is unlikely to increase the hysteresis amount, when the slope of decrease of the indicated current value according to the depressurization-starting differential pressure is corrected to be gentler, the indicated current value can be set appropriately and it is thus possible to restrain the phenomenon that the differential pressure is much smaller than the required differential pressure. The differential pressure can thus be controlled more accurately.

When the differential pressure is decreased, the variation manner of the hysteresis amount can be influenced also by a brake fluid temperature in the channel provided with the differential pressure valve. In view of this, the indicated-value-setting unit preferably corrects the slope of decrease of the indicated current value in accordance with a brake fluid temperature in the channel. At a brake fluid temperature that is likely to increase the hysteresis amount, when the slope of decrease of the indicated current value according to the depressurization-starting differential pressure is corrected to be steeper, the indicated current value can be set appropriately and the differential pressure can thus be decreased appropriately. At a brake fluid temperature that is unlikely to increase the hysteresis amount, when the slope of decrease of the indicated current value according to the depressurization-starting differential pressure is corrected to be gentler, the indicated current value can be set appropriately and it is thus possible to restrain the phenomenon that the differential pressure is much smaller than the required differential pressure. The differential pressure can thus be controlled more accurately.

The required differential pressure may be changed from the first differential pressure to the second differential pressure and then may be changed to a third differential pressure larger than the second required differential pressure. The braking control device for vehicle may include a pressurization-starting differential pressure acquisition unit configured to acquire, as a pressurization-starting differential pressure, a differential pressure at transition from the depressurizing state to the pressurizing state. Assume that a pressurizing differential pressure area is set as an area between the pressurization-starting differential pressure and a boundary differential pressure having a value obtained by adding a predetermined differential pressure according to the pressurization-starting differential pressure to the pressurization-starting differential pressure. In this case, the indicated-value-setting unit preferably sets a slope of increase of the indicated current value, as an amount of increase of the indicated current value relative to an amount of increase of the required differential pressure, to be gentler as the pressurization-starting differential pressure is smaller, when the required differential pressure is included in the pressurizing differential pressure area in the pressurizing state.

Assume that, in the state where the value of the driving current flowing to the differential pressure valve is decreased and the differential pressure is thus equal to the second differential pressure, the required differential pressure is set to the third differential pressure larger than the second differential pressure. In this case, the indicated current value is made larger than the indicated current value at the time point when the differential pressure is equal to the second differential pressure, in order to increase the differential pressure to the required differential pressure (i.e. the third differential pressure). The driving current value is then increased along with the indicated current value thus changed. The rate of increase of the differential pressure relative to increase of the driving current value is likely to be higher as the pressurization-starting differential pressure is smaller. In other words, the rate of decrease of the hysteresis amount relative to increase of the driving current value is likely to be lower as the pressurization-starting differential pressure is smaller. The differential pressure can thus be smoothly increased to the required differential pressure (i.e. the third differential pressure) by increasing the indicated current value in a manner according to the rate of decrease of the hysteresis amount relative to increase of the driving current value.

When satisfying both the pressurizing state and the state where the required differential pressure (i.e. the third differential pressure) is included in the pressurizing differential pressure area in the above configuration, along with the rate of decrease of the hysteresis amount relative to increase of the driving current value, the slope of increase of the indicated current value, i.e. the amount of increase of the indicated current value relative to the amount of increase of the required differential pressure, is made gentler as the pressurization-starting differential pressure is smaller, and the indicated current value is increased with the slope of increase. The value of the driving current flowing to the differential pressure valve then increases along with the increase of the indicated current value. In this case, the driving current value increases in a manner according to the rate of decrease of the hysteresis amount relative to increase of the driving current value. The differential pressure can thus be smoothly increased to the required differential pressure (i.e. the third differential pressure) by increasing the indicated current value with the slope of increase of the indicated current value according to the pressurization-starting differential pressure.

Even when the required differential pressure is larger than the upper limit value in the pressurizing differential pressure area, the indicated current value is made larger than the reference indicated current value according to the required differential pressure (i.e. the third differential pressure) by increasing the indicated current value with the slope according to the pressurization-starting differential pressure. This case may lead to the phenomenon that the value of the driving current flowing to the differential pressure valve is too large and the differential pressure is much larger than the required differential pressure (i.e. the third differential pressure). In this regard, the above configuration allows the indicated current value to be increased with the slope of increase of the indicated current value according to the pressurization-starting differential pressure only in a case where the required differential pressure is included in the pressurizing differential pressure area. This can restrain the phenomenon that the differential pressure is much larger than the required differential pressure (i.e. the third differential pressure).

The differential pressure can thus be controlled accurately even in the pressurizing state.

When the indicated current value according to the required differential pressure is set as a reference indicated current value, the braking control device for vehicle may include a pressurizing correction amount setting unit configured to set a correction amount referred to for correction of the indicated current value in the pressurizing state. In this case, the indicated-value-setting unit may set the indicated current value in accordance with a value obtained by subtracting the correction amount set by the pressurizing correction amount setting unit from the reference indicated current value in the pressurizing state. Preferably, the pressurizing correction amount setting unit sets a slope of decrease of the correction amount, as an amount of decrease of the correction amount relative to an amount of increase of the required differential pressure, to be gentler as the pressurization-starting differential pressure is smaller and decreases the correction amount with the slope of decrease, when the required differential pressure is included in the pressurizing differential pressure area in the pressurizing state. Preferably, in a case where the required differential pressure is larger than an upper limit value in the pressurizing differential pressure area in the pressurizing state, the pressurizing correction amount setting unit sets the slope of decrease of the correction amount to be gentler as the pressurization-starting differential pressure is smaller and decreases the correction amount with the slope of decrease when the differential pressure by the differential pressure valve increases in the pressurizing differential pressure area, and sets the correction amount to be equal to "0 (zero)" when the differential pressure by the differential pressure valve exceeds the upper limit value in the pressurizing differential pressure area.

In the above configuration, when the required differential pressure is included in the pressurizing differential pressure area in the pressurizing state, the slope of decrease of the correction amount is made gentler as the pressurization-starting differential pressure is smaller and the correction amount is decreased with the slope of decrease. The indicated current value is set by subtracting the correction amount from the reference indicated current value as the indicated current value according to the required differential pressure, so as to achieve the configuration that allows the indicated current value to be increased with the slope of increase of the indicated current value according to the pressurization-starting differential pressure.

The required differential pressure (i.e. the third differential pressure) is occasionally larger than the upper limit value in the pressurizing differential pressure area. In a state where the differential pressure by the differential pressure valve increases in the pressurizing differential pressure area in this case, the slope of decrease of the correction amount is made gentler as the pressurization-starting differential pressure is smaller and the correction amount is decreased with the slope of decrease. When the differential pressure by the differential pressure valve increases and exceeds the upper limit value in the pressurizing differential pressure area, the correction amount is made equal to "0 (zero)". It is thus possible to restrain the indicated current value from becoming larger than the reference indicated current value and the driving current value from becoming too large. It is thus possible to restrain the phenomenon that the differential pressure is much larger than the required differential pressure (i.e. the third differential pressure).

When the required differential pressure is changed from the second differential pressure to the third differential pressure, the driving current value starts increasing along with the indicated current value thus changed in order to increase the differential pressure to the required differential pressure (i.e. the third differential pressure). The rate of increase of the differential pressure relative to increase of the driving current value is likely to be higher as a pressurization-starting hysteresis amount, i.e. the hysteresis amount at transition from the depressurizing state to the pressurizing state, is larger. In other words, the rate of decrease of the hysteresis amount relative to increase of the driving current value is likely to be lower as the pressurization-starting hysteresis amount is larger. The differential pressure can thus be smoothly increased to the required differential pressure (i.e. the third differential pressure) by controlling increase of the driving current value in a manner according to the rate of decrease of the hysteresis amount relative to increase of the driving current value.

The braking control device for vehicle may include: a pressurization-starting differential pressure acquisition unit configured to acquire, as a pressurization-starting differential pressure, a differential pressure at transition from the depressurizing state to the pressurizing state; and a pressurization-starting hysteresis amount acquisition unit configured to acquire, as a pressurization-starting hysteresis amount, a hysteresis amount at transition from the depressurizing state to the pressurizing state. Assume that a pressurizing differential pressure area is set as an area between the pressurization-starting differential pressure and a boundary differential pressure as a sum of a predetermined differential pressure according to the pressurization-starting hysteresis amount acquired by the pressurization-starting hysteresis amount acquisition unit and the pressurization-starting differential pressure. In this case, the indicated-value-setting unit preferably sets a slope of increase of the indicated current value, as an amount of increase of the indicated current value relative to an amount of increase of the required differential pressure, to be gentler as the pressurization-starting hysteresis amount is larger, when the required differential pressure is included in the pressurizing differential pressure area in the pressurizing state.

When satisfying both the pressurizing state and the state where the required differential pressure (i.e. the third differential pressure) is included in the pressurizing differential pressure area in the above configuration, along with the rate of decrease of the hysteresis amount relative to increase of the driving current value, the slope of increase of the indicated current value, i.e. the amount of increase of the indicated current value relative to the amount of increase of the required differential pressure, is made gentler as the pressurization-starting hysteresis amount is larger, and the indicated current value is increased with the slope of increase. In this case, the driving current value increases in a manner according to the rate of decrease of the hysteresis amount relative to increase of the driving current value. The differential pressure can thus be smoothly increased to the required differential pressure (i.e. the third differential pressure) by increasing the indicated current value with the slope of increase of the indicated current value according to the pressurization-starting hysteresis amount.

Even when the required differential pressure is larger than the upper limit value in the pressurizing differential pressure area, the indicated current value is made larger than the reference indicated current value according to the required differential pressure (i.e. the third differential pressure) by increasing the indicated current value with the slope of increase of the indicated current value according to the pressurization-starting hysteresis amount. This case may lead to the phenomenon that the value of the driving current flowing to the differential pressure valve is too large and the differential pressure is much larger than the required differential pressure (i.e. the third differential pressure). In this regard, the above configuration allows the indicated current value to be increased with the slope of increase of the indicated current value according to the pressurization-starting hysteresis amount only in a case where the required differential pressure is included in the pressurizing differential pressure area. This can restrain the phenomenon that the differential pressure is much larger than the required differential pressure (i.e. the third differential pressure).

The differential pressure can thus be controlled accurately even in the pressurizing state.

The braking control device for vehicle may include a pressurizing correction amount setting unit configured to set a correction amount referred to for correction of the indicated current value in the pressurizing state. The indicated-value-setting unit may set the indicated current value in accordance with a value obtained by subtracting the correction amount set by the pressurizing correction amount setting unit from the reference indicated current value in the pressurizing state. In this case, preferably, the pressurizing correction amount setting unit sets a slope of decrease of the correction amount, as an amount of decrease of the correction amount relative to an amount of increase of the required differential pressure, to be gentler as the pressurization-starting hysteresis amount is larger and decreases the correction amount with the slope of decrease, when the required differential pressure is included in the pressurizing differential pressure area in the pressurizing state. Preferably, in a case where the required differential pressure is larger than an upper limit value in the pressurizing differential pressure area in the pressurizing state, the pressurizing correction amount setting unit sets the slope of decrease of the correction amount to be gentler as the pressurization-starting hysteresis amount is larger and decreases the correction amount with the slope of decrease when the differential pressure by the differential pressure valve increases in the pressurizing differential pressure area, and sets the correction amount to be equal to "0 (zero)" when the differential pressure by the differential pressure valve exceeds the upper limit value in the pressurizing differential pressure area.

In the above configuration, when the required differential pressure is included in the pressurizing differential pressure area in the pressurizing state, the slope of decrease of the correction amount is made gentler as the pressurization-starting hysteresis amount is larger and the correction amount is decreased with the slope of decrease. When the required differential pressure (i.e. the third differential pressure) is included in the pressurizing differential pressure area, the indicated current value is set by subtracting the correction amount from the reference indicated current value as the indicated current value according to the required differential pressure, so as to achieve the configuration that allows the indicated current value to be increased with the slope of increase of the indicated current value according to the pressurization-starting hysteresis amount.

The required differential pressure (i.e. the third differential pressure) is occasionally larger than the upper limit value in the pressurizing differential pressure area. In a state where the differential pressure by the differential pressure valve increases in the pressurizing differential pressure area in this case, the slope of decrease of the correction amount is made gentler as the pressurization-starting hysteresis amount is larger and the correction amount is decreased with the slope of decrease. When the differential pressure by the differential pressure valve increases and exceeds the upper limit value in the pressurizing differential pressure area, the correction amount is made equal to "0 (zero)". It is thus possible to restrain the indicated current value from becoming larger than the reference indicated current value and the driving current value from becoming too large. It is thus possible to restrain the phenomenon that the differential pressure is much larger than the required differential pressure (i.e. the third differential pressure).

BRIEF DESCRIPTION OF DRAWINGS

FIG. 13($b$) sets forth text associated with the flowchart shown in FIG. 13($a$).

FIG. 14($b$) sets forth text associated with the flowchart shown in FIG. 14($a$).

DESCRIPTION OF EMBODIMENTS

A braking control device for vehicle according to an embodiment will now be described below with reference to FIGS. 1 to 15($d$).

Figure 1:
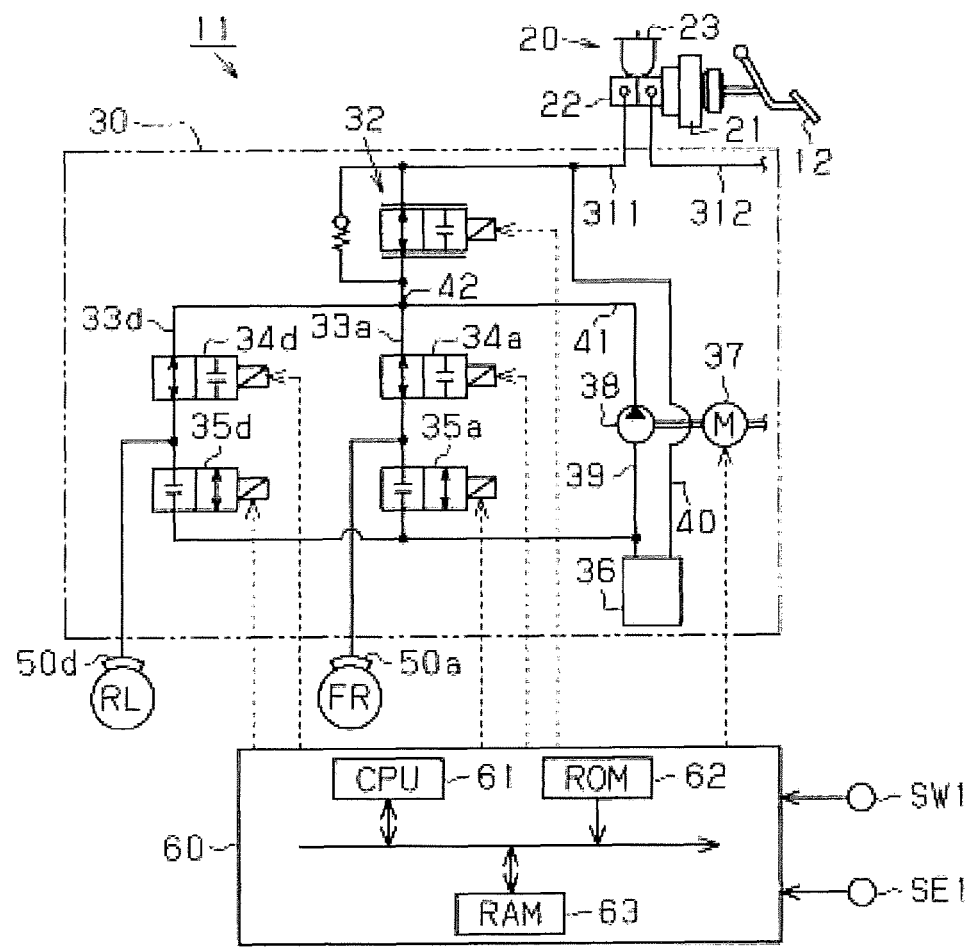
FIG. 1 is a schematic configuration diagram of part of a brake device including an ECU as a braking control device for vehicle according to an embodiment.

FIG. 1 depicts part of a brake device 11 including an electronic control device (hereinafter, referred to as an "ECU") 60 serving as a braking control device according to the present embodiment. As depicted in FIG. 1, the brake device 11 includes a fluid pressure generator 20 coupled with a brake pedal 12, and a brake actuator 30 configured to automatically adjust braking torque individually to a plurality of wheels of the vehicle. The brake actuator 30 is connected with a plurality of wheel cylinders serving as brake mechanisms individually corresponding to the wheels.

The fluid pressure generator 20 is provided with a booster 21, a master cylinder 22, and a reservoir 23. When a driver operates the brake pedal 12, driver's operation force to the brake pedal 12 is increased by the booster 21 and a brake fluid pressure (hereinafter, also referred to as an "MC pressure") according to the increased operation force is generated in the master cylinder 22. The wheel cylinder is supplied with brake fluid according to the MC pressure in the master cylinder 22 from the reservoir 23 via the master cylinder 22 and the brake actuator 30. The brake mechanism then applies, to the wheel, braking torque according to a brake fluid pressure generated in the wheel cylinder (hereinafter, also referred to as a "WC pressure").

The brake actuator 30 is provided with dual hydraulic circuits 311 and 312. The first hydraulic circuit 311 is connected with a wheel cylinder 50$a$ for the front right wheel and a wheel cylinder 50$d$ for the rear left wheel. The second hydraulic circuit 312 is connected with the wheel cylinder for the front left wheel and the wheel cylinder for the rear right wheel.

The first hydraulic circuit 311 is provided with a differential pressure valve 32 as a constantly opened linear solenoid valve disposed at a channel connecting the master cylinder 22 and the wheel cylinders 50a and 50d. The first hydraulic circuit 311 is provided, between the differential pressure valve 32 and the wheel cylinders 50a and 50d, with a channel 33a for the front right wheel and a channel 33d for the rear left wheel. The channels 33a and 33d are provided with pressurizing valves 34a and 34d as constantly opened solenoid valves configured to be driven in order to regulate pressurization of the WC pressures in the wheel cylinders 50a and 50d and depressurizing valves 35a and 35d as constantly closed solenoid valves configured to be driven in order to decrease the WC pressures, respectively.

The first hydraulic circuit 311 is connected with a reservoir 36 configured to temporarily reserve brake fluid flown out of the wheel cylinders 50a and 50d via the depressurizing valves 35a and 35d and a pump 38 configured to be driven in accordance with rotation of a motor 37. The reservoir 36 is connected to the pump 38 via a suction flow path 39 and is also connected, via a master flow path 40, to a channel between the differential pressure valve 32 and the master cylinder 22. The pump 38 is connected, via a feed flow path 41, to a connection point 42 between the pressurizing valves 34a and 34d and the differential pressure valve 32. When the motor 37 rotates, the pump 38 sucks brake fluid from the reservoir 36 and the master cylinder 22 via the suction flow path 39 and the master flow path 40, and discharges the brake fluid into the feed flow path 41.

The second hydraulic circuit 312 is configured substantially similarly to the first hydraulic circuit 311. Accordingly, the second hydraulic circuit 312 will not be described in detail.

The ECU 60 is electrically connected with various detection systems such as a brake switch SW1 configured to detect whether or not the brake pedal 12 is operated and a pressure sensor SE1 configured to detect an MC pressure. The ECU 60 is also electrically connected with the differential pressure valve 32, the pressurizing valves 34a and 34d, the depressurizing valves 35a and 35d, the motor 37, and the like configuring the brake actuator 30. The ECU 60 controls the brake actuator 30 in accordance with information detected by the various detection systems.

The ECU 60 thus configured includes a microcomputer composed of a CPU 61, a ROM 62, a RAM 63, and the like. The ROM 62 preliminarily stores various programs to be executed by the CPU 61, maps, thresholds, and the like. The RAM 63 temporarily stores various types of information to be updated appropriately.

The brake actuator 30 is configured to drive the differential pressure valve 32 and the pump 38 (i.e. the motor 37) and generate a differential pressure between the master cylinder 22 and the wheel cylinders 50a and 50d, so as to control braking torque to the wheels. Specifically, when a value Id of driving current flowing to a solenoid of the differential pressure valve 32 is increased, the differential pressure valve 32 has a smaller opening degree and the differential pressure increases. The WC pressures in the wheel cylinders 50a and 50d then increase to increase braking torque applied from the braking mechanisms to the wheels FR and RL. In contrast, when the driving current value Id is decreased, the differential pressure valve 32 has a smaller opening degree and the differential pressure decreases. The WC pressures in the wheel cylinders 50a and 50d then decrease to decrease braking torque applied from the braking mechanisms to the wheels FR and RL.

In the following description, a differential pressure, which is actually generated between the master cylinder 22 and the wheel cylinders 50a and 50d by driving the differential pressure valve 32 and the pump 38, will be referred to as an "actual differential pressure X". A differential pressure, which is required to adjust braking torque to the wheels FR and RL (a required value of the differential pressure by the differential pressure valve 32), will be referred to as a "required differential pressure M". The "driving current value Id" is a value of current actually flowing to the solenoid of the differential pressure valve 32, or a value according to the current value. Accordingly, the driving current value Id increases when an indicated current value Ip to the differential pressure valve 32 is increased. In contrast, the driving current value Id decreases when the indicated current value Ip is decreased.

Figure 2:
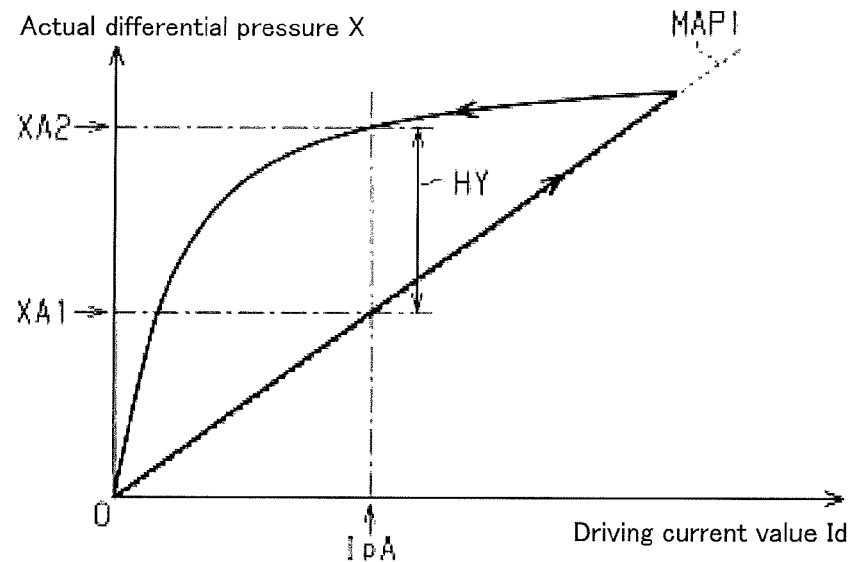
FIG. 2 is a graph of exemplary relation between a value of driving current flowing to a differential pressure valve and an actual differential pressure between a master cylinder and a wheel cylinder, which is generated by the driven differential pressure valve.

Described next with reference to FIG. 2 is a map MAP1 referred to for driving the differential pressure valve 32.

The map MAP1 indicated with the broken line in FIG. 2 is preliminarily stored in the ROM 62 and is referred to for setting the indicated current value Ip in accordance with the required differential pressure being set. The map MAP1 indicates the relation between the actual differential pressure X and the driving current value Id of the case of increasing the driving current value Id in order to increase the actual differential pressure X. As indicated with the broken line in FIG. 2, the actual differential pressure X gradually increases as the driving current value Id increases. Accordingly, as the required differential pressure M is set to a larger value, the indicated current value IP set with reference to the map MAP1 is made larger. The map MAP1 corresponds to a "property" indicating the relation between the driving current value Id and the actual differential pressure X of the case of increasing the driving current value Id. The ROM 62 storing the map (the property) MAP1 corresponds to a "storage unit".

The map MAP1 may be replaced with a function indicating the relation between the actual differential pressure X and the driving current value Id of the case of increasing the actual differential pressure X from "0 (zero)". The indicated current value Ip can be set to a value according to the required differential pressure M with reference to such a function. This function corresponds to the "property" in this case.

As indicated with the solid line in FIG. 2, a solenoid valve such as the differential pressure valve 32 has a hysteresis. Specifically, there is generated a difference between an actual differential pressure XA1 of the case of increasing the driving current value Id to a predetermined indicated current value IpA and an actual differential pressure XA2 of the case of decreasing the driving current value Id to the predetermined indicated current value IpA. The difference between the actual differential pressure XA1 and the actual differential pressure XA2 will be referred to as a "hysteresis amount HY".

Figure 3:
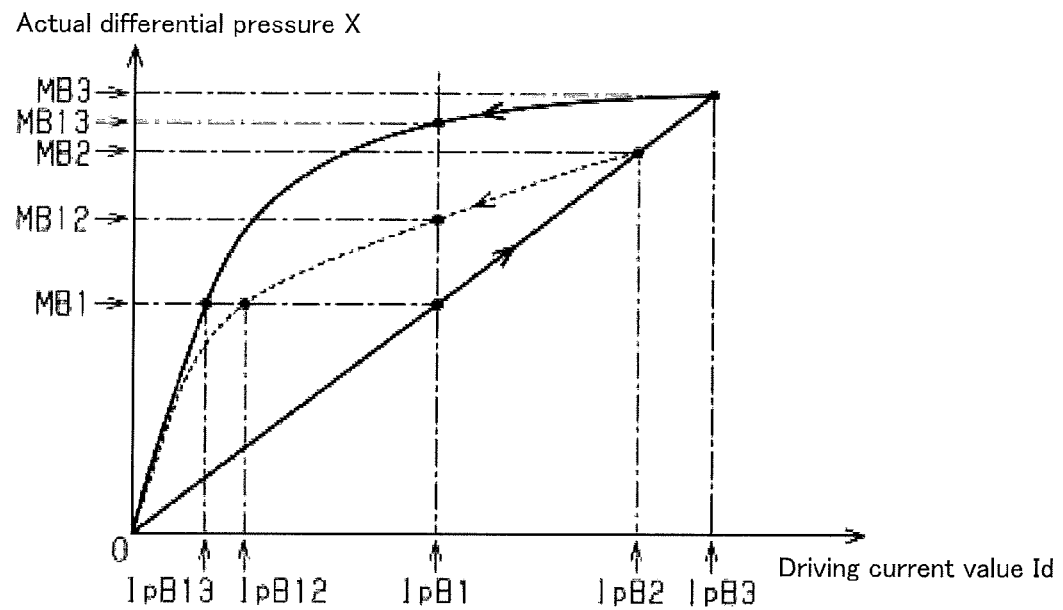
FIG. 3 is a graph indicating how a variation manner of a hysteresis amount changes depending on the level of a depressurization-starting differential pressure at transition from a pressurizing state to a depressurizing state.

FIG. 3 depicts to the case of increasing the driving current value Id and then decreasing the driving current value Id to a first indicated current value IpB1. The indicated current value Ip according to a first required differential pressure MB1 will be referred to as the first indicated current value IpB1 whereas the indicated current value Ip according to a second required differential pressure MB2 larger than the first required differential pressure MB1 will be referred to as a second indicated current value IpB2. Furthermore, the indicated current value Ip according to a third required differential pressure MB3 larger than the second required differential pressure MB2 will be referred to as a third indicated current value IpB3. The indicated current values IpB1, IpB2, and IpB3 according to the required differential pressures MB1, MB2, and MB3 are current values obtained with reference to the map MAP1.

As indicated with the solid line in FIG. 3, assume that, by increasing the driving current value Id from "0 (zero)" to the third indicated current value IpB3, the actual differential pressure X is increased from "0 (zero)" to the third required differential pressure MB3 and the driving current value Id is then decreased to the first indicated current value IpB1. The rate of decrease of the actual differential pressure X relative to decrease of the driving current value Id is low in this case. Therefore, the actual differential pressure X at the time point when the driving current value Id decreases and reaches the first indicated current value IpB1 becomes a thirteenth differential pressure MB13 that is smaller than the third required differential pressure MB3 but is larger than the first required differential pressure MB1.

As indicated with the broken line in FIG. 3, assume that, by increasing the driving current value Id from "0 (zero)" to the second indicated current value IpB2, the actual differential pressure X is increased from "0 (zero)" to the second required differential pressure MB2 and the driving current value Id is then decreased to the first indicated current value IpB1. In this case, the rate of decrease of the actual differential pressure X relative to decrease of the driving current value Id is higher than that of the case of decreasing the driving current value Id from the third indicated current value IpB3. Accordingly, the actual differential pressure X at the time point when the driving current value Id reaches the first indicated current value IpB1 becomes a twelfth differential pressure MB12 that is larger than the first required differential pressure MB1 and is smaller than the thirteenth differential pressure MB13. Specifically, even when the driving current value Id decreases and reaches the first indicated current value IpB1, the level of the actual differential pressure X at the time point when the driving current value Id reaches the first indicated current value IpB1 changes depending on the level of a depressurization-starting differential pressure XD as the differential pressure at the time point when the actual differential pressure X starts decreasing, in other words, the driving current value Id starts decreasing.

As indicated with the solid line in FIG. 3, when the actual differential pressure X increases from "0 (zero)" to the third required differential pressure MB3 and then decreases to the first required differential pressure MB1, the driving current value Id is decreased to a thirteenth current value IpB13 smaller than the first indicated current value IpB1. In other words, the actual differential pressure X becomes substantially equal to the first required differential pressure MB1 by decreasing the driving current value Id to the thirteenth current value IpB13.

As indicated with the broken line in FIG. 3, when the actual differential pressure X increases from "0 (zero)" to the second required differential pressure MB2 and then decreases to the first required differential pressure MB1, the driving current value Id is decreased to a twelfth current value IpB12 that is smaller than the first indicated current value IpB1 and is larger than the thirteenth current value IpB13. In other words, the actual differential pressure X becomes substantially equal to the first required differential pressure MB1 by decreasing the driving current value Id to the twelfth current value IpB12.

Specifically, when decreasing the actual differential pressure X to the required differential pressure M by decreasing the driving current value Id, the increasing manner of the hysteresis amount HY changes in accordance with the depressurization-starting differential pressure XD. The actual differential pressure X can thus be decreased to the required differential pressure M by setting the indicated current value Ip in consideration of the depressurization-starting differential pressure XD.

The variation manner of the hysteresis amount HY of the case of decreasing the actual differential pressure X by decreasing the driving current value Id will be described next with reference to FIG. 4.

Figure 4:
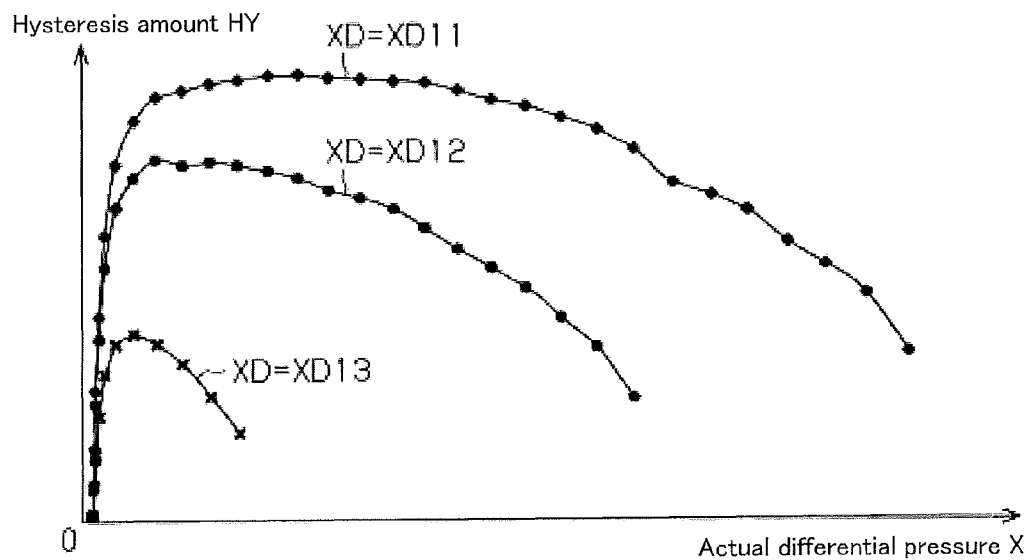
FIG. 4 is a graph indicating, per depressurization-starting differential pressure, relation between the actual differential pressure and the hysteresis amount at transition from the pressurizing state to the depressurizing state.

As indicated in FIG. 4, in an initial state immediately after the actual differential pressure X starts decreasing, the rate of decrease of the actual differential pressure X relative to decrease of the driving current value Id is higher as the depressurization-starting differential pressure XD is smaller. The hysteresis amount HY is thus increased substantially gently relatively to decrease of the driving current value Id. For example, when the depressurization-starting differential pressure XD is an eleventh depressurization-starting differential pressure XD11, the hysteresis amount HY increases with a steeper slope than that of the case where the depressurization-starting differential pressure XD is another depressurization-starting differential pressure XD12 or XD13 smaller than the eleventh depressurization-starting differential pressure XD11. Similarly, when the depressurization-starting differential pressure XD is the twelfth depressurization-starting differential pressure XD12, the hysteresis amount HY increases with a slope that is gentler than that of the case where the depressurization-starting differential pressure XD is the eleventh depressurization-starting differential pressure XD11 but is steeper than that of the case where the depressurization-starting differential pressure XD is the thirteenth depressurization-starting differential pressure XD13 smaller than the twelfth depressurization-starting differential pressure XD12.

When the actual differential pressure X decreases and becomes approximate to "0 (zero)", the hysteresis amount HY is decreased with a substantially constant slope relatively to decrease of the actual differential pressure X regardless of whether the depressurization-starting differential pressure XD is the depressurization-starting differential pressure XD11, XD12, or XD13.

Described next is a control method for the case of decreasing the actual differential pressure X to the required differential pressure M in consideration of the variation manner of the hysteresis amount HY.

When decreasing the actual differential pressure X to the required differential pressure M, a correction amount Z according to the hysteresis amount HY is calculated and the correction amount Z is subtracted from the required differential pressure M to obtain a corrected required differential pressure MZ. The indicated current value Ip is set to a value according to the corrected required differential pressure MZ with reference to the map indicated with the broken line in FIG. 2. The actual differential pressure X is smoothly decreased to the required differential pressure M by decreasing the driving current value Id in accordance with the indicated current value Ip.

Figure 5:
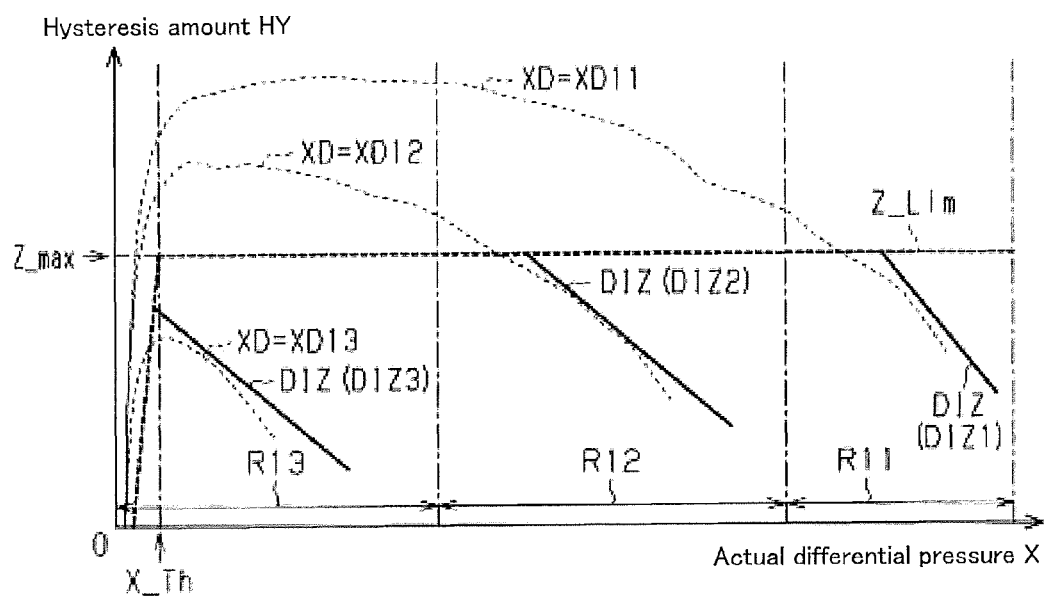
FIG. 5 is a graph indicating a map for determination of a slope of increase of a correction amount referred to for correction of a required differential pressure and a map for determination of a limiting value according to the actual differential pressure at transition from the pressurizing state to the depressurizing state.

The correction amount Z referred to for calculation of the corrected required differential pressure MZ is calculated with reference to the map in FIG. 5. The correction amount Z is gradually increased as the actual differential pressure X decreases from the depressurization-starting differential pressure XD, specifically, the driving current value Id starts decreasing and the actual differential pressure X approaches to the required differential pressure M. Furthermore, a slope of increase DIZ of the correction amount Z in this case is gentler as the depressurization-starting differential pressure XD is smaller. The slope of increase DIZ of the correction amount Z indicates an "amount of increase of the correction amount Z relative to the amount of decrease of the required differential pressure M".

The indicated current value set to a value according to the required differential pressure M with reference to the map in FIG. 2 will be referred to as a "reference indicated current value". When the required differential pressure M is decreased, the indicated current value Ip is set in accordance with the value obtained by subtracting the correction amount Z from the required differential pressure M thus changed. In other words, the indicated current value Ip can be regarded as a value according to the value obtained by subtracting a "converted correction amount obtained by converting the correction amount Z to a current value" from the "reference indicated current value according to the required differential pressure M having been changed". When the required differential pressure M is decreased, the indicated current value Ip is thus decreased from the reference indicated current value in accordance with the slope of increase of the correction amount Z. Accordingly, the driving current value Id decreases along with decrease of the indicated current value Ip. The converted correction amount according to the present embodiment corresponds to a "correction amount referred to for correction of the indicated current value".

The map in FIG. 5 will be described next. FIG. 5 includes broken lines indicating variation manners of the hysteresis amount HY relative to decrease of the actual differential pressure X indicated in FIG. 4.

FIG. 5 indicates a map of the relation between the slope of increase DIZ of the correction amount Z and the depressurization-starting differential pressure XD. As indicated in FIG. 5, the slope of increase DIZ substantially agrees with the variation slope of the hysteresis amount HY in the initial state. The slope of increase DIZ is thus gentler as the depressurization-starting differential pressure XD is smaller. The slope of increase DIZ can have a value of or a value close to an inclination of a linear function obtained by approximating the increasing manner of the hysteresis amount HY relative to decrease of the actual differential pressure X.

In the present embodiment, differential pressure areas R11, R12, and R13 are preliminarily set as areas of depressurization-starting differential pressures having different ranges, and the slope of increase DIZ is set for each of the differential pressure areas R11, R12, and R13. Specifically, the slope of increase in the eleventh differential pressure area R11 including the eleventh depressurization-starting differential pressure XD11 is a slope of increase DIZ1 of the hysteresis amount HY of the case where the depressurization-starting differential pressure XD is the eleventh depressurization-starting differential pressure XD11. Furthermore, the slope of increase in the twelfth differential pressure area R12 including the twelfth depressurization-starting differential pressure XD12 is a slope of increase DIZ2 of the hysteresis amount HY of the case where the depressurization-starting differential pressure XD is the twelfth depressurization-starting differential pressure XD12. Moreover, the slope of increase in the thirteenth differential pressure area R13 including the thirteenth depressurization-starting differential pressure XD13 is a slope of increase DIZ3 of the hysteresis amount HY of the case where the depressurization-starting differential pressure XD is the thirteenth depressurization-starting differential pressure XD13. When the twelfth differential pressure area R12 is referred to as a "first area", the slope of increase DIZ in the twelfth differential pressure area R12 is gentler than the slope of increase DIZ in the eleventh differential pressure area R11 that can be referred to as a "second area" as a higher pressure area than the first area.

When the correction amount Z is obtained in accordance with the slope of increase DIZ, the correction amount Z becomes larger as the actual differential pressure X approaches to the required differential pressure M, which may cause the correction amount Z to become too large. In this case, the corrected required differential pressure MZ may become too small and the indicated current value Ip, which is set in accordance with the corrected required differential pressure MZ, may also become too small. The indicated current value Ip having become too small may cause the phenomenon that the actual differential pressure X is much smaller than the required differential pressure M.

In this regard, in order to restrain such a phenomenon, the present embodiment provides a limiting value Z_Lim referred to for preventing the correction amount Z from becoming too large. Specifically, as indicated in FIG. 5, when the actual differential pressure X is not less than a specified differential pressure X_Th, the limiting value Z_Lim is set to an upper limit value Z_max that is preliminarily set. In contrast, when the actual differential pressure X is less than the specified differential pressure X_Th, the limiting value Z_Lim is made smaller as the actual differential pressure X is smaller. The specified differential pressure X_Th is set to a value of or close to the differential pressure causing the hysteresis amount HY to rapidly start decreasing. Furthermore, the slope of decrease of the limiting value Z_Lim is slightly steeper than the slope of decrease of the hysteresis amount HY of the case where the actual differential pressure X is less than the specified differential pressure X_Th.

The limiting value Z_Lim can be converted to a current value. The limiting value thus converted to a current value corresponds to the "limiting value" to the indicated current value Ip. Specifically, when the required differential pressure M is changed in the present embodiment, the indicated current value Ip is increased or decreased from the reference indicated current value so as not to cause the converted correction amount according to the correction amount Z to exceed the limiting value.

In the depressurizing state where the required differential pressure is decreased, the correction amount Z is increased with the slope according to the depressurization-starting differential pressure XD as the differential pressure at transition from the pressurizing state to the depressurizing state (i.e. the slope of increase of the correction amount). The indicated current value Ip is decreased with the slope of decrease of the indicated current value in proportion to the slope of increase of the correction amount. When the correction amount Z reaches the limiting value Z_Lim, the correction amount Z is made equal to the limiting value Z_Lim. As indicated in FIG. 5, the differential pressure at the time point when the correction amount Z reaches the limiting value Z_Lim differs depending on the depressurization-starting differential pressure XD. The differential pressure at the time point when the correction amount Z reaches the limiting value Z_Lim corresponds to a "boundary differential pressure", and the difference between the depressurization-starting differential pressure XD and the boundary differential pressure corresponds to a "predetermined differential pressure according to the depressurization-starting differential pressure XD". The area between the depressurization-starting differential pressure XD and the boundary differential pressure corresponds to a "depressurization-starting differential pressure area".

The variation manner of the driving current value Id of the case of decreasing the actual differential pressure X to the required differential pressure M will be described next with reference to FIG. 6. The broken line in FIG. 6 indicates the variation manner of a reference driving current value IdA as the driving current value of the case of not correcting the required differential pressure M.

Figure 6:
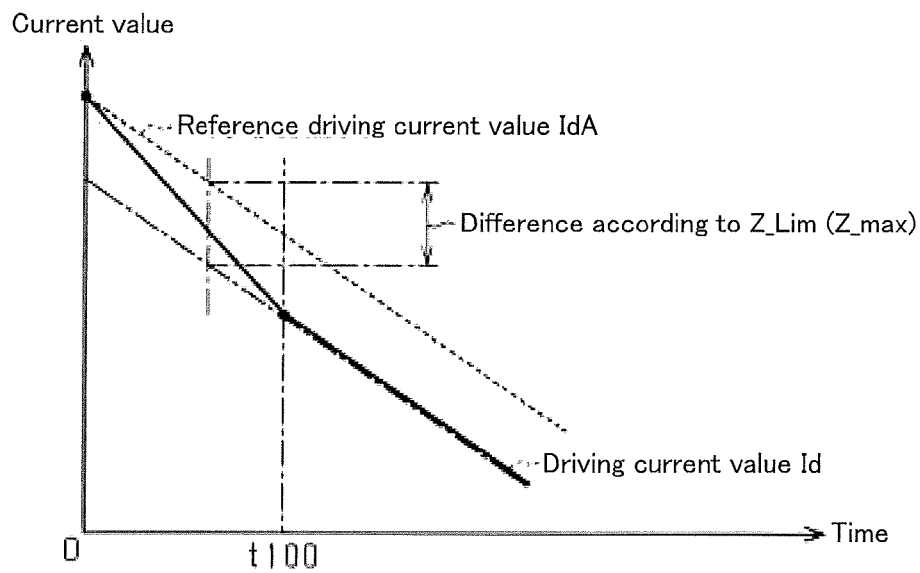
FIG. 6 is a functional graph indicating a decreasing manner of a driving current value in a case where the required differential pressure is corrected with the correction amount at transition from the pressurizing state to the depressurizing state.

As indicated in FIG. 6, when the required differential pressure M is changed to a smaller value, the driving current value Id decreases. The slope of increase DIZ is set to a slope according to the depressurization-starting differential pressure XD with reference to the map in FIG. 5. The correction amount Z gradually increases with the slope according to the slope of increase DIZ. The difference between the driving current value Id and the reference driving current value IdA thus gradually increases with elapse of time. At a subsequent time point t100, the correction amount Z reaches the limiting value Z_Lim (the upper limit value Z_max in this case). From the time point t100, the driving current value Id decreases in a state where the difference between the driving current value Id and the reference driving current value IdA is kept in accordance with the limiting value Z_Lim. When the actual differential pressure X is decreased to the required differential pressure M, the driving current value Id is kept constant.

After being changed from "0 (zero)" to a first differential pressure, the required differential pressure M is changed to a second differential pressure smaller than the first differential pressure. The required differential pressure M is then changed to a third differential pressure larger than the second differential pressure.

Figure 7:
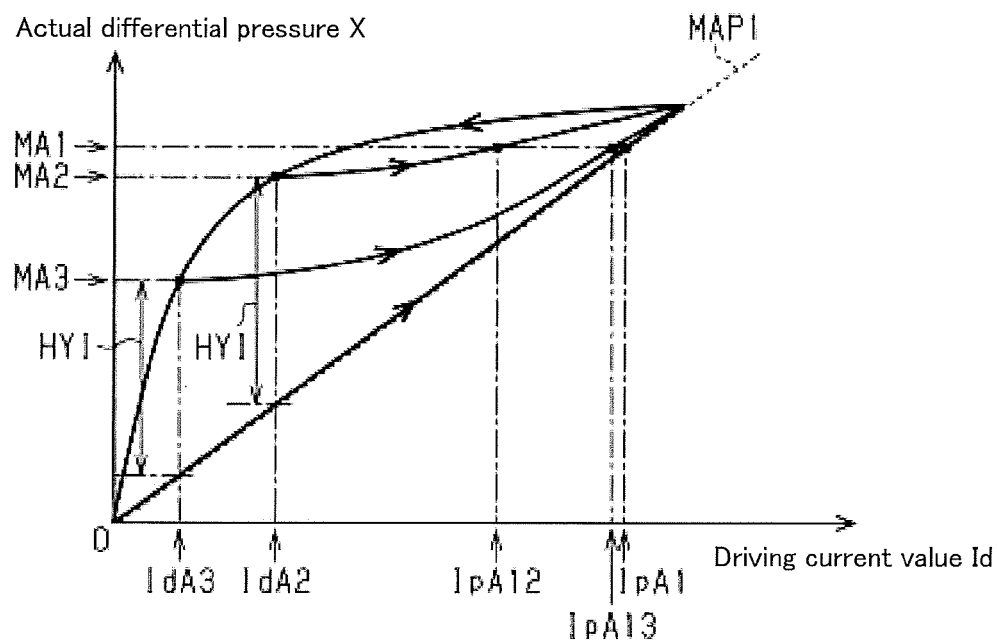
FIG. 7 is a graph indicating a variation manner of the actual differential pressure at transition again from the depressurizing state to the pressurizing state.

Described next with reference to FIG. 7 is the variation manner of the actual differential pressure X of the case of ending decreasing the actual differential pressure X and then increasing the actual differential pressure X to a first required differential pressure MA1. The indicated current value Ip according to the first required differential pressure MA1 will be referred to as a first indicated current value IpA1 whereas the driving current value Id at the time point when the actual differential pressure X decreases and reaches a second required differential pressure MA2 smaller than the first required differential pressure MA1 will be referred to as a second driving current value IdA2. Furthermore, the driving current value Id at the time point when the actual differential pressure X decreases and reaches a third required differential pressure MA3 smaller than the second required differential pressure MA2 will be referred to as a third driving current value IdA3.

Assume that, as indicated in FIG. 7, the actual differential pressure X is decreased to the second required differential pressure MA2 by decreasing the driving current value Id to the second driving current value IdA2, and is then increased to a required differential pressure larger than the second required differential pressure MA2 (the first required differential pressure MA1 in this case). The driving current value Id is increased to a twelfth current value IpA12 smaller than the first indicated current value IpA1 in this case. In other words, the actual differential pressure X is made substantially equal to the first required differential pressure MA1 by increasing the driving current value Id to the twelfth current value IpA12.

Meanwhile, assume that the actual differential pressure X is decreased to the third required differential pressure MA3 by decreasing the driving current value Id to the third driving current value IdA3, and is then increased to the first required differential pressure MA1. The driving current value Id is increased to a thirteenth current value IpA13 that is smaller than the first indicated current value IpA1 and is larger than the twelfth current value IpA12 in this case. In other words, the actual differential pressure X is made substantially equal to the first required differential pressure MB1 by increasing the driving current value Id to the thirteenth current value IpA13.

When the actual differential pressure X is increased to the required differential pressure M in the state where the hysteresis is generated as described above (i.e. the state where the hysteresis amount HY is not "0 (zero)"), the increasing manner of the actual differential pressure X relative to increase of the driving current value Id changes in accordance with a pressurization-starting differential pressure XI as the differential pressure at the time point when the actual differential pressure X starts increasing, and a pressurization-starting hysteresis amount HYI as the hysteresis amount at the time point when the actual differential pressure X starts increasing. When increasing the actual differential pressure X again in this manner, it is preferred to correct the required differential pressure M in consideration of the pressurization-starting differential pressure XI as the differential pressure at the time point when the actual differential pressure X starts increasing and the pressurization-starting hysteresis amount HYI as the hysteresis amount at this time point.

Figure 8:
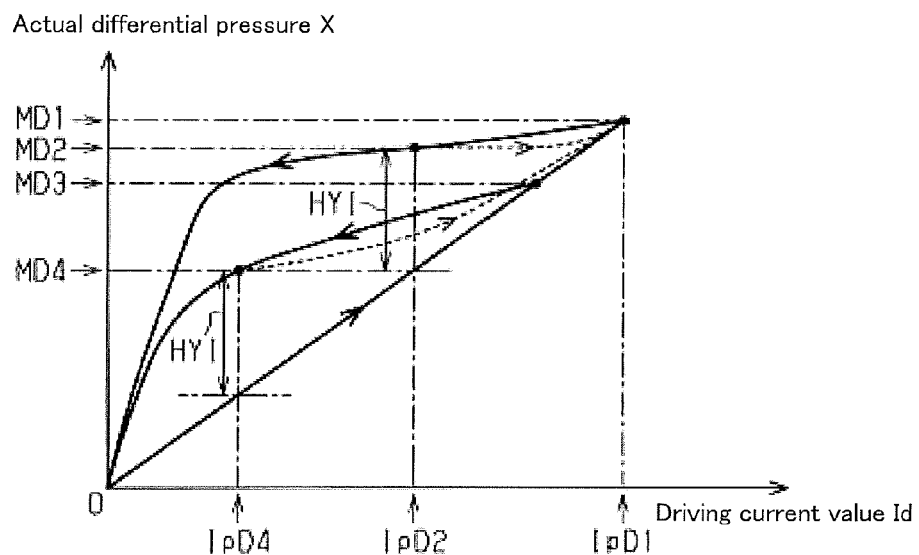
FIG. 8 is a functional graph indicating that a decreasing manner of the hysteresis amount differs in a case where a pressurization-starting differential pressure is equivalent but a pressurization-starting hysteresis amount differs at transition from the depressurizing state to the pressurizing state.

Described next with reference to FIG. 8 is how the increasing manner of the actual differential pressure X changes depending on the level of the pressurization-starting differential pressure XI. Two patterns will be described in this case.

Specifically, according to the first pattern, the required differential pressure M is changed from a first required differential pressure MD1 to a second required differential pressure MD2 smaller than the first required differential pressure MD1, and is then changed again from the second required differential pressure MD2 to the first required differential pressure MD1. According to the second pattern, the required differential pressure M is changed from a third required differential pressure MD3 to a fourth required differential pressure MD4 smaller than the third required differential pressure MD3, and is then changed from the fourth required differential pressure MD4 to the first required differential pressure MD1.

Assume that the third required differential pressure MD3 is smaller than the first and second required differential pressures MD1 and MD2. Furthermore, assume that the hysteresis amount HY of the case where the required differential pressure M is kept at the second required differential pressure MD2 in the first pattern is equal to the hysteresis amount HY of the case where the required differential pressure M is kept at the fourth required differential pressure MD4 in the second pattern.

As indicated in FIG. 8, when the required differential pressure M is changed from the first required differential pressure MD1 to the second required differential pressure MD2 in the first pattern, the actual differential pressure X is decreased due to decrease of the driving current value Id. When the driving current value Id reaches a second indicated current value IpD2, the actual differential pressure X is kept at the second required differential pressure MD2. When the required differential pressure M is subsequently changed to the first required differential pressure MD1, the driving current value Id starts increasing. The actual differential pressure X is comparatively unlikely to increase in the initial state from the time point when the driving current value Id starts increasing. Specifically, the slope of increase of the actual differential pressure X, i.e. the amount of increase of the actual differential pressure X relative to the variation amount of the driving current value Id, is comparatively gentle. The slope of decrease of the hysteresis amount, i.e. the amount of decrease of the hysteresis amount HY relative to the variation amount of the driving current value Id, is thus comparatively steep. When the driving current value Id increases in this case, the hysteresis amount HY reaches "0 (zero)" before the actual differential pressure X reaches the first required differential pressure MD1. When the driving current value Id subsequently increases and reaches a first indicated current value IpD1 according to the first required differential pressure MD1, the actual differential pressure X reaches the first required differential pressure MD1.

Meanwhile, when the required differential pressure M is changed from the third required differential pressure MD3 to the fourth required differential pressure MD4 in the second pattern, the actual differential pressure X is decreased due to decrease of the driving current value Id. When the driving current value Id reaches a fourth indicated current value IpD4, the actual differential pressure X is kept at fourth required differential pressure MD4. When the required differential pressure M is subsequently changed to the first required differential pressure MD1, the driving current value Id starts increasing. Immediately after the driving current value Id starts increasing, the actual differential pressure X is more likely to increase in comparison to the first pattern because the pressurization-starting differential pressure XI is smaller. In other words, in comparison to the first pattern, the slope of increase of the actual differential pressure X is steeper and the slope of decrease of the hysteresis amount HY is thus gentler. Also in this case, when the driving current value Id increases, the hysteresis amount HY reaches "0 (zero)" before the actual differential pressure X reaches the first required differential pressure MD1. When the driving current value Id subsequently increases and reaches a first indicated current value IpD1 according to the first required differential pressure MD1, the actual differential pressure X reaches the first required differential pressure MD1.

Specifically, under the condition of the equal pressurization-starting hysteresis amount HYI, as the pressurization-starting differential pressure XI is smaller, the actual differential pressure X is more likely to increase and the hysteresis amount HY is less likely to decrease in the initial state.

Figure 9:
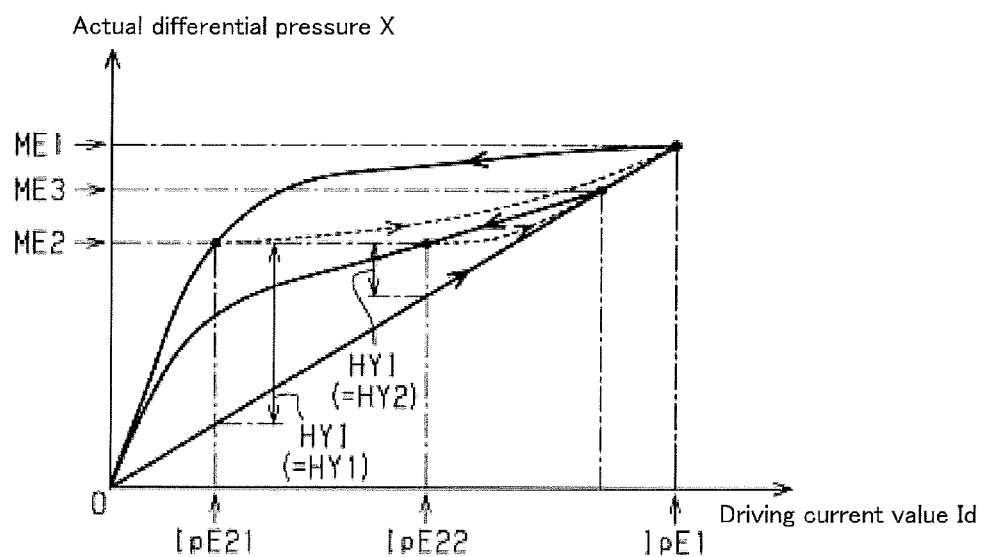
FIG. 9 is a functional graph indicating that the decreasing manner of the hysteresis amount differs in a case where the pressurization-starting hysteresis amount is equivalent but the pressurization-starting differential pressure differs at transition from the depressurizing state to the pressurizing state.

Described next with reference to FIG. 9 is how the increasing manner of the actual differential pressure X changes depending on the level of the pressurization-starting hysteresis amount HYI. Two patterns will be described in this case.

Specifically, according to the first pattern, the required differential pressure M is changed from a first required differential pressure ME1 to a second required differential pressure ME2 smaller than the first required differential pressure ME1, and is then changed again from the second required differential pressure ME2 to the first required differential pressure ME1. According to the second pattern, the required differential pressure M is changed from a third required differential pressure ME3 larger than the second required differential pressure ME2 to the second required differential pressure ME2, and is then changed from the second required differential pressure ME2 to the first required differential pressure ME1. Assume that the third required differential pressure ME3 is smaller than the first required differential pressure ME1.

As indicated in FIG. 9, when the required differential pressure M is changed from the first required differential pressure ME1 to the second required differential pressure ME2 in the first pattern, the actual differential pressure X is decreased due to decrease of the driving current value Id. When the driving current value Id reaches a twenty-first indicated current value IpE21, the actual differential pressure X is kept at second required differential pressure ME2. In this case, a hysteresis amount HY1 at the time point when the actual differential pressure X is kept at the second required differential pressure ME2 is comparatively large. When the required differential pressure M is subsequently changed to the first required differential pressure MEL the driving current value Id starts increasing. The actual differential pressure X is comparatively likely to increase in the initial state from the time point when the driving current value Id starts increasing, because the pressurization-starting hysteresis amount HYI (=HY1) is comparatively large. In other words, the slope of increase of the actual differential pressure X is comparatively steep and the slope of decrease of the hysteresis amount HY is thus comparatively gentle. In this case, the hysteresis amount HY reaches "0 (zero)" before the actual differential pressure X reaches the first required differential pressure ME1. When the driving current value Id subsequently reaches the first indicated current value IpE1 according to the first required differential pressure ME1, the actual differential pressure X reaches the first required differential pressure ME1.

Meanwhile, when the required differential pressure M is changed from the third required differential pressure ME3 to the second required differential pressure ME2 in the second pattern, the actual differential pressure X is decreased due to decrease of the driving current value Id. When the driving current value Id reaches a twenty-second indicated current value IpE22 larger than the twenty-first indicated current value IpE21, the actual differential pressure X is kept at the second required differential pressure ME2. In this case, a hysteresis amount HY2 at the time point when the actual differential pressure X is kept at the second required differential pressure ME2 is smaller than the hysteresis amount HY1 in the first pattern. When the required differential pressure M is subsequently changed to the first required differential pressure MEL the driving current value Id starts increasing. The actual differential pressure X is unlikely to increase in the initial state from the time point when the driving current value Id starts increasing, because pressurization-starting hysteresis amount HYI (=HY2) is smaller than the pressurization-starting hysteresis amount HYI (=HY1) in the first pattern. In other words, the slope of increase of the actual differential pressure X is gentle and the slope of decrease of the hysteresis amount HY is thus comparatively steep. Also in this case, the hysteresis amount HY reaches "0 (zero)" before the actual differential pressure X reaches the first required differential pressure ME1. When the driving current value Id subsequently reaches the first indicated current value IpE1 according to the first required differential pressure MEL the actual differential pressure X reaches the first required differential pressure ME1.

Specifically, under the condition of the equal pressurization-starting differential pressure XI, as the pressurization-starting hysteresis amount HYI is smaller, the actual differential pressure X is less likely to increase and the hysteresis amount HY is decreased rapidly in the initial state.

Described next is a control method for the case of increasing the actual differential pressure X again in consideration of the decreasing manner of the hysteresis amount HY.

When increasing the actual differential pressure X again to the required differential pressure M, the correction amount Z is calculated in accordance with the pressurization-starting differential pressure XI, the pressurization-starting hysteresis amount HYI, and the actual differential pressure X at the time point, and the correction amount Z is subtracted from the required differential pressure M to obtain the corrected required differential pressure MZ. The indicated current value Ip is set to a value according to the corrected required differential pressure MZ with reference to the map indicated with the broken line in FIG. 2. The actual differential pressure X is smoothly increased again to the required differential pressure M by increasing the driving current value Id in accordance with the indicated current value Ip.

The correction amount Z referred to for calculation of the corrected required differential pressure MZ is made gradually smaller as the actual differential pressure X becomes larger. Preferably, the correction amount Z in this case has a slope of decrease DDZ that is equivalent to the slope of decrease of the hysteresis amount HY in the initial state.

A method of calculating the slope of decrease DDZ will now be described.

As described above, in the case where the hysteresis amount HY is larger than "0 (zero)" at the time point when the actual differential pressure X starts increasing, the slope of decrease of the hysteresis amount HY can be estimated from the pressurization-starting differential pressure XI and the pressurization-starting hysteresis amount HYI. In other words, the slope of decrease DDZ of the correction amount, i.e. the amount of decrease of the correction amount Z relative to the amount of increase of the required differential pressure M, can be set in accordance with the pressurization-starting differential pressure XI and the pressurization-starting hysteresis amount HYI. For example, a reference slope of decrease DDZB is set to a value according to the pressurization-starting differential pressure XI with reference to the map in FIG. 10. Furthermore, a third correction gain G3 referred to for correction of the reference slope of decrease DDZB is set to a value according to the pressurization-starting hysteresis amount HYI. The slope of decrease DDZ is obtained by substituting the reference slope of decrease DDZB and the third correction gain G3 thus set for a relational expression (Equation 1) below.

$$DDZ = DDZB \times G3 \qquad \text{(Equation 1)}$$

As described above, the slope of decrease of the hysteresis amount HY is likely to be gentler as the pressurization-starting hysteresis amount HYI is larger. The third correction gain G3 is thus made smaller as the pressurization-starting hysteresis amount HYI is larger. The third correction gain G3 is, however, larger than "0 (zero)".

Figures 10, 11:
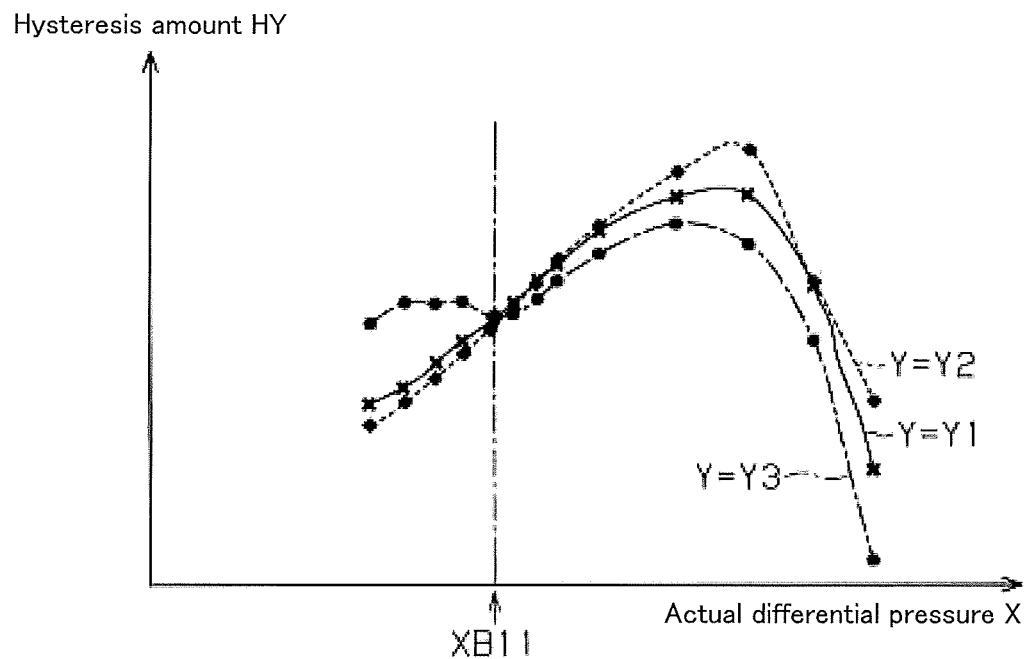
FIG. 10 is a chart indicating a map for determination of a slope of decrease of the correction amount referred to for correction of the required differential pressure at transition from the depressurizing state to the pressurizing state.
FIG. 11 is a graph indicating variation of the hysteresis amount generated in accordance with a flow rate of brake fluid.

In the map in FIG. 10, the reference slope of decrease DDZB is set for each of differential pressure areas R21, R22, and R23 as areas of pressurization-starting differential pressures having different ranges. As described above, the slope of decrease of the hysteresis amount HY is likely to be gentler as the pressurization-starting differential pressure XI is larger. A reference slope of decrease DDZB1 corresponding to the twenty-first differential pressure area R21 as the highest pressure area is set to be steeper than reference slopes of decrease DDZB2 and DDZB3 corresponding to the other differential pressure areas R22 and R23. The reference slope of decrease DDZB2 corresponding to the twenty-second differential pressure area R22 as the second highest pressure area is set to be gentler than the reference slope of decrease DDZB1 corresponding to the twenty-first differential pressure area R21 but be steeper than the reference slope of decrease DDZB3 corresponding to the twenty-third slope differential pressure area R23.

When the correction amount Z is obtained in accordance with the slope of decrease DDZ, the correction amount Z becomes smaller as the actual differential pressure X approaches to the required differential pressure M, and may become smaller than "0 (zero)" to have a negative value. In this case, the corrected required differential pressure MZ may become too large and the indicated current value Ip, which is set in accordance with the corrected required differential pressure MZ, may also become too large. The indicated current value Ip having become too large may cause the phenomenon that the actual differential pressure X is much larger than the required differential pressure M. In this regard, in order to restrain such a phenomenon, the present embodiment prevents the correction amount Z from becoming less than "0 (zero)". Specifically, the correction amount Z is made to reach "0 (zero)" when the correction amount Z obtained from the slope of decrease DDZ has a negative value.

In the pressurizing state of increasing the required differential pressure, the correction amount Z is decreased with a slope according to the pressurization-starting differential pressure XI and the pressurization-starting hysteresis amount HYI (the slope of decrease of the correction amount). Specifically, the indicated current value Ip is increased with the slope of increase of the indicated current value in proportion to the slope of decrease of the correction amount. When the correction amount Z reaches "0 (zero)", the correction amount Z is fixed at "0 (zero)". The differential pressure at the time point when the correction amount Z reaches "0 (zero)" differs depending on the pressurization-starting differential pressure XI and the pressurization-starting hysteresis amount HYI. The differential pressure at the time point when the correction amount Z reaches "0 (zero)" corresponds to the "boundary differential pressure", and the difference between the pressurization-starting differential pressure XI and the boundary differential pressure corresponds to a "predetermined differential pressure according to the pressurization-starting differential pressure XI". The area between the pressurization-starting differential pressure XI and the boundary differential pressure corresponds to a "pressurization-starting differential pressure area".

As indicated in FIG. 11, the variation manner of the hysteresis amount HY is also changed in accordance with the flow rate of brake fluid flowing in each of the hydraulic circuits 311 and 312 provided with the differential pressure valve 32, i.e., a brake fluid discharge amount Y from the pump 38. The solid line in FIG. 11 indicates a variation manner of the hysteresis amount HY relative to variation of the actual differential pressure X of the case where the discharge amount Y is a first discharge amount Y1. The broken line in FIG. 11 indicates a variation manner of the hysteresis amount HY relative to variation of the actual differential pressure X of the case where the discharge amount Y is a second discharge amount Y2 smaller than the first discharge amount Y1. The dashed line in FIG. 11 indicates a variation manner of the hysteresis amount HY relative to variation of the actual differential pressure X of the case where the discharge amount Y is a third discharge amount Y3 larger than the first discharge amount Y1.

When the discharge amount Y is the second discharge amount Y2 and the actual differential pressure X is not less than an eleventh differential pressure XB11, the hysteresis amount HY is larger than that of the case where the discharge amount Y is the first discharge amount Y1. In contrast, when the discharge amount Y is the second discharge amount Y2 and the actual differential pressure X is less than the eleventh differential pressure XB11, the hysteresis amount HY is smaller than that of the case where the discharge amount Y is the first discharge amount Y1. When the discharge amount Y is the third discharge amount Y3 and the actual differential pressure X is not less than the eleventh differential pressure XB11, the hysteresis amount HY is smaller than that of the case where the discharge amount Y is the first discharge amount Y1. In contrast, when the discharge amount Y is the third discharge amount Y3 and the actual differential pressure X is less than the eleventh differential pressure XB11, the hysteresis amount HY is larger than that of the case where the discharge amount Y is the first discharge amount Y1.

The first discharge amount Y1 according to the present embodiment is set as a reference discharge amount. The slope of increase DIZ and the slope of decrease DDZ apply to the case where the discharge amount Y is the first discharge amount Y1. It is preferred to correct the slope of increase DIZ and the slope of decrease DDZ when the discharge amount Y is the second discharge amount Y2 or the third discharge amount Y3.

Figure 12:
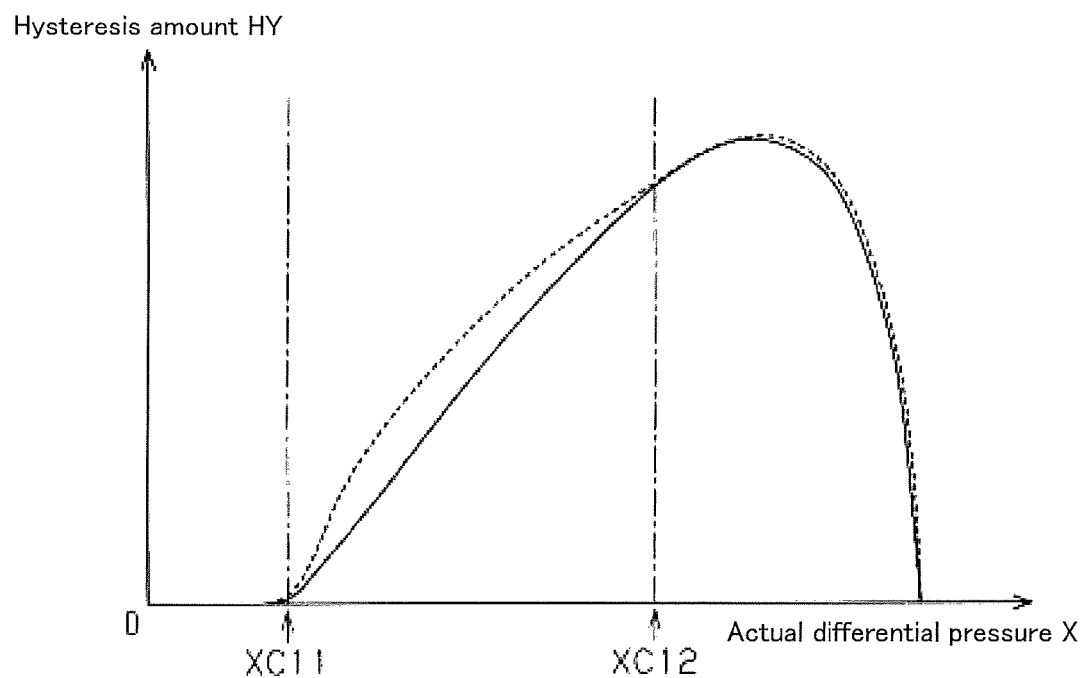
FIG. 12 is a graph indicating variation of the hysteresis amount generated in accordance with a brake fluid temperature.

As indicated in FIG. 12, the variation manner of the hysteresis amount HY is also changed in accordance with a temperature TMP of brake fluid flowing in each of the hydraulic circuits 311 and 312. The solid line in FIG. 12 indicates a variation manner of the hysteresis amount HY relative to variation of the actual differential pressure X of the case where the brake fluid temperature TMP is the room temperature. The broken line in FIG. 12 indicates a variation manner of the hysteresis amount HY relative to variation of the actual differential pressure X of the case where the brake fluid temperature TMP is extremely low.

When the actual differential pressure X is approximate to "0 (zero)", in other words, when the actual differential pressure X is less than a first differential pressure XC11, the hysteresis amount HY is kept substantially constant regardless of the brake fluid temperature TMP. When the actual differential pressure X is not less than a second differential pressure XC12, the hysteresis amount HY is also kept substantially constant regardless of the brake fluid temperature TMP. In contrast, when the actual differential pressure X is not less than the first differential pressure XC11 and is less than the second differential pressure XC12, the hysteresis amount HY is made larger as the brake fluid temperature TMP is lower. It is accordingly preferred to correct the slope of increase DIZ and the slope of decrease DDZ when the hysteresis amount HY changes depending on the brake fluid temperature TMP.

Described next is a method of correcting the slope of increase DIZ and the slope of decrease DDZ in accordance with the discharge amount Y and the brake fluid temperature TMP.

When a first correction gain according to the discharge amount Y is denoted by reference sign G1 and a second correction gain according to the brake fluid temperature TMP is denoted by reference sign G2, a corrected slope of increase DRI can be expressed by the following relational expression (Equation 2) whereas a corrected slope of decrease DRD can be expressed by the following relational expression (Equation 3). Specifically, the corrected slope of increase DRI thus calculated corresponds to the slope of increase DIZ that is corrected in accordance with the discharge amount Y and the brake fluid temperature TMP whereas the corrected slope of decrease DRD corresponds to the slope of decrease DDZ that is corrected in accordance with the discharge amount Y and the brake fluid temperature TMP.

$$DRI = DIZ \times G1 \times G2 \quad \text{(Equation 2)}$$

$$DRD = DDZ \times G1 \times G2 \quad \text{(Equation 3)}$$

The first correction gain G1 can be set to a value according to the discharge amount Y with reference to the map according to the graph in FIG. 11. Specifically, read out is the map according to the discharge amount Y at the timing (e.g. the map corresponding to the broken line in FIG. 11 when the discharge amount Y is the second discharge amount Y2), and also read out is the map of the case where the discharge amount Y is the first discharge amount Y1 (i.e. the map corresponding to the solid line in FIG. 11, which will be hereinafter also referred to as a "reference discharge amount map"). Obtained with reference to the map according to the discharge amount Y at the timing is the hysteresis amount according to the actual differential pressure X at the time point, i.e. a first hysteresis amount HY11. Also obtained with reference to the reference discharge amount map is the hysteresis amount according to the actual differential pressure X at the time point, i.e. a second hysteresis amount HY12. If the difference obtained by subtracting the second hysteresis amount HY12 from the first hysteresis amount HY11 has a positive value, the first correction gain G1 is set to a value larger than "1". In contrast, if the difference has a negative value, the first correction gain G1 is set to a value less than "1". If the difference is "0 (zero)", the first correction gain G1 is set to "1".

The second correction gain G2 can be set to a value according to the brake fluid temperature TMP with reference to the map according to the graph in FIG. 12. Specifically, read out are the map according to the brake fluid temperature TMP at the timing as well as the map for the case where the brake fluid temperature TMP is the room temperature (hereinafter, also referred to as a "reference fluid temperature map"). Obtained with reference to the map according to the brake fluid temperature TMP at the timing is the hysteresis amount according to the actual differential pressure X at the time point, i.e. a first hysteresis amount HY21. Also obtained with reference to the reference fluid temperature map is the hysteresis amount according to the actual differential pressure X at the timing, i.e. a second hysteresis amount HY22. If the difference obtained by subtracting the second hysteresis amount HY22 from the first hysteresis amount HY21 has a positive value, the second correction gain G2 is set to a value larger than "1". In contrast, if the difference has a negative value, the second correction gain G2 is set to a value less than "1". If the difference is "0 (zero)", the second correction gain G2 is set to "1".

Figure 13A:
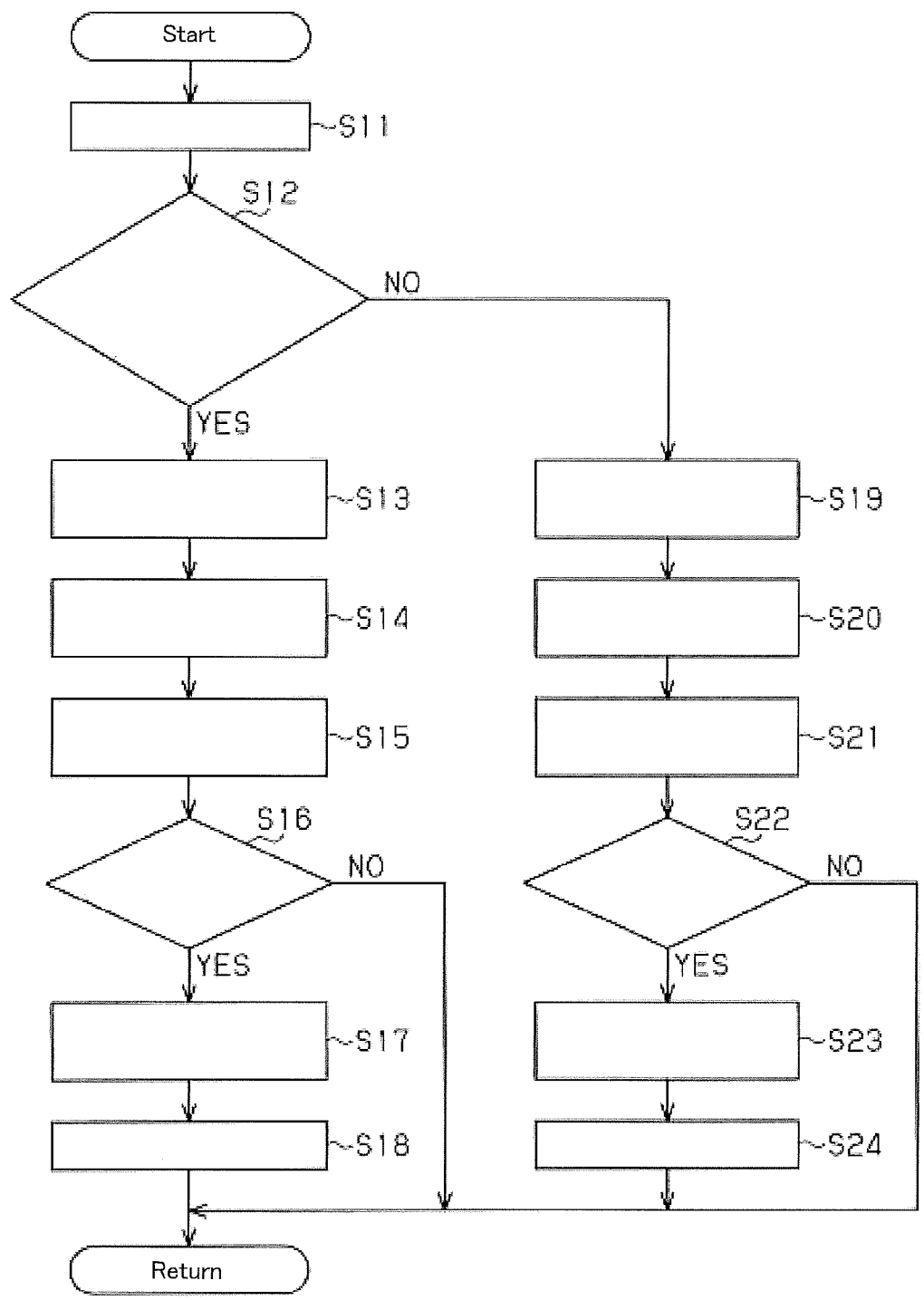
FIG. 13($a$) is an explanatory flowchart of processing routine executed by the ECU as a braking control device according to an embodiment for determination of start of increase and decrease of the differential pressure.

Described next with reference to the flowchart in FIGS. 13(a) and 13(b) is processing routine executed by the ECU 60 for detection of a time point when the differential pressure starts decreasing and a time point when the differential pressure starts increasing. This processing routine is executed in each preliminarily set control cycle.

As depicted in FIGS. 13(a) and 13(b), the ECU 60 calculates the present actual differential pressure X (step S11). The ECU 60 subsequently determines whether or not a depressurization determination flag FLG1 is OFF and a pressurization determination flag FLG2 is ON (step S12).

The depressurization determination flag FLG1 is set ON if the actual differential pressure X is not increased whereas the pressurization determination flag FLG2 is set ON if the actual differential pressure X is not decreased. According to the present embodiment, the "pressurizing state" indicates the state where the depressurization determination flag FLG1 is OFF and the pressurization determination flag FLG2 is ON whereas the "depressurizing state" indicates the state where the depressurization determination flag FLG1 is ON and the pressurization determination flag FLG2 is OFF.

If the depressurization determination flag FLG1 is OFF and the pressurization determination flag FLG2 is ON (YES in step S12), in other words, in the pressurizing state, the ECU 60 shifts the processing to subsequent step S13. In contrast, if the depressurization determination flag FLG1 is ON and the pressurization determination flag FLG2 is OFF (NO in step S12), in other words, in the depressurizing state, the ECU 60 shifts the processing to step S19 to be described later.

In step S13, the ECU 60 sets a preliminarily set initial value H_minA as a minimum hold value H_min. This initial value H_minA is set to the maximum value or a value larger than the maximum value of the differential pressure that can be generated by the brake actuator 30 controlled by the ECU 60. The ECU 60 subsequently compares a present maximum hold value H_max and the actual differential pressure X calculated in step S11, and sets the larger value as the most updated maximum hold value H_max (step S14). Specifically, if the actual differential pressure is increasing, the maximum hold value H_max gradually increases along with the increasing actual differential pressure X. In contrast, if the actual differential pressure X increases and reaches the required differential pressure M and is kept at the required differential pressure M, the maximum hold value H_max is also kept constant.

The ECU 60 then subtracts the actual differential pressure X calculated in step S11 from the maximum hold value H_max updated in step S14, and sets the difference $(=H\_max-X)$ as a differential pressure decrease amount $\Delta X1$ (step S15). The ECU 60 subsequently determines whether or not the calculated differential pressure decrease amount $\Delta X1$ is not less than a decrease determination value $\Delta\Delta X1\_Th$ that is preliminarily set (step S16). This decrease determination value $\Delta X1\_Th$ is a reference value for determination of whether or not the actual differential pressure X has actually started decreasing. If the differential pressure decrease amount $\Delta X1$ is not less than the decrease determination value $\Delta X1\_Th$, the required differential pressure M is changed to a smaller value. It is thus possible to determine in this case that the actual differential pressure X has started decreasing. In contrast, if the differential pressure decrease amount $\Delta X1$ is less than the decrease determination value $\Delta X1\_Th$, it is possible to determine that the actual differential pressure X is increasing or has not yet started decreasing.

If the differential pressure decrease amount $\Delta X1$ is less than the decrease determination value $\Delta X1\_Th$ (NO in step S16), the ECU 60 temporarily ends the present processing routine with no execution of the processing in step S17 and S18. If the differential pressure decrease amount $\Delta X1$ is not less than the decrease determination value $\Delta X1\_Th$ (YES in step S16), the ECU 60 turns ON the depressurization determination flag FLG1 and turns OFF the pressurization determination flag FLG2 (step S17). The ECU 60 stores the present actual differential pressure X as the depressurization-starting differential pressure XD in a predetermined area of the RAM 63 (step S18). In other words, if determined that the pressurizing state has transitioned to the depressurizing state (YES in step S16), the actual differential pressure X at the time point is acquired as the depressurization-starting differential pressure XD. In this regard, the ECU 60 according to the present embodiment also functions as a "depressurization-starting differential pressure acquisition unit". The ECU 60 then temporarily ends the present processing routine.

In step S19, the ECU 60 sets a preliminarily set initial value H_maxA as the maximum hold value H_max. This initial value H_maxA is set to an extremely small value such as "0 (zero)". The ECU 60 subsequently compares the present minimum hold value H_min and the actual differential pressure X calculated in step S11, and sets the smaller value as the most updated minimum hold value H_min (step S20).

The ECU 60 then subtracts the minimum hold value H_min updated in step S20 from the actual differential pressure X calculated in step S11, and sets the difference $(=X-H\_min)$ as a differential pressure increase amount $\Delta X2$ (step S21). The ECU 60 subsequently determines whether or not the differential pressure increase amount $\Delta X2$ thus calculated is not less than an increase determination value $\Delta X2\_Th$ that is preliminarily set (step S22). This increase determination value $\Delta X2\_Th$ is a reference value for determination of whether or not the actual differential pressure X has actually started increasing. If the differential pressure increase amount $\Delta X2$ is not less than the increase determination value $\Delta X2\_Th$, the required differential pressure M is changed to a larger value. It is thus possible to determine in this case that the actual differential pressure X has started increasing. In contrast, if the differential pressure increase amount $\Delta X2$ is less than the increase determination value $\Delta X2\_Th$, it is possible to determine that the actual differential pressure X is decreasing or has not yet started increasing. The increase determination value $\Delta X2\_Th$ can be equal to the decrease determination value $\Delta X1\_Th$ or can be different from the decrease determination value $\Delta X1\_Th$ as long as the increase determination value $\Delta X2\_Th$ is larger than "0 (zero)".

If the differential pressure increase amount $\Delta X2$ is less than the increase determination value $\Delta X2\_Th$ (NO in step S22), the ECU 60 temporarily ends the present processing routine with no execution of the processing in step S23 and S24. In contrast, if the differential pressure increase amount $\Delta X2$ is not less than the increase determination value $\Delta X2\_Th$ (YES in step S22), the ECU 60 turns OFF the depressurization determination flag FLG1 and turns ON the pressurization determination flag FLG2 (step S23). The ECU 60 stores the present actual differential pressure X as the pressurization-starting differential pressure XI in a predetermined area of the RAM 63 (step S24). In other words, if determined that the depressurizing state has transitioned to the pressurizing state (YES in step S22), the actual differential pressure X at the time point is acquired as the pressurization-starting differential pressure XI. In this regard, the ECU 60 according to the present embodiment also functions as a "pressurization-starting differential pressure acquisition unit". The ECU 60 then temporarily ends the present processing routine.

Described next with reference to the flowchart in FIGS. 14(*a*) and 14(*b*) is processing routine executed by the ECU 60 for determination of the indicated current value Ip to the differential pressure valve 32. This processing routine is executed in each of the control cycles.

Figure 14A:
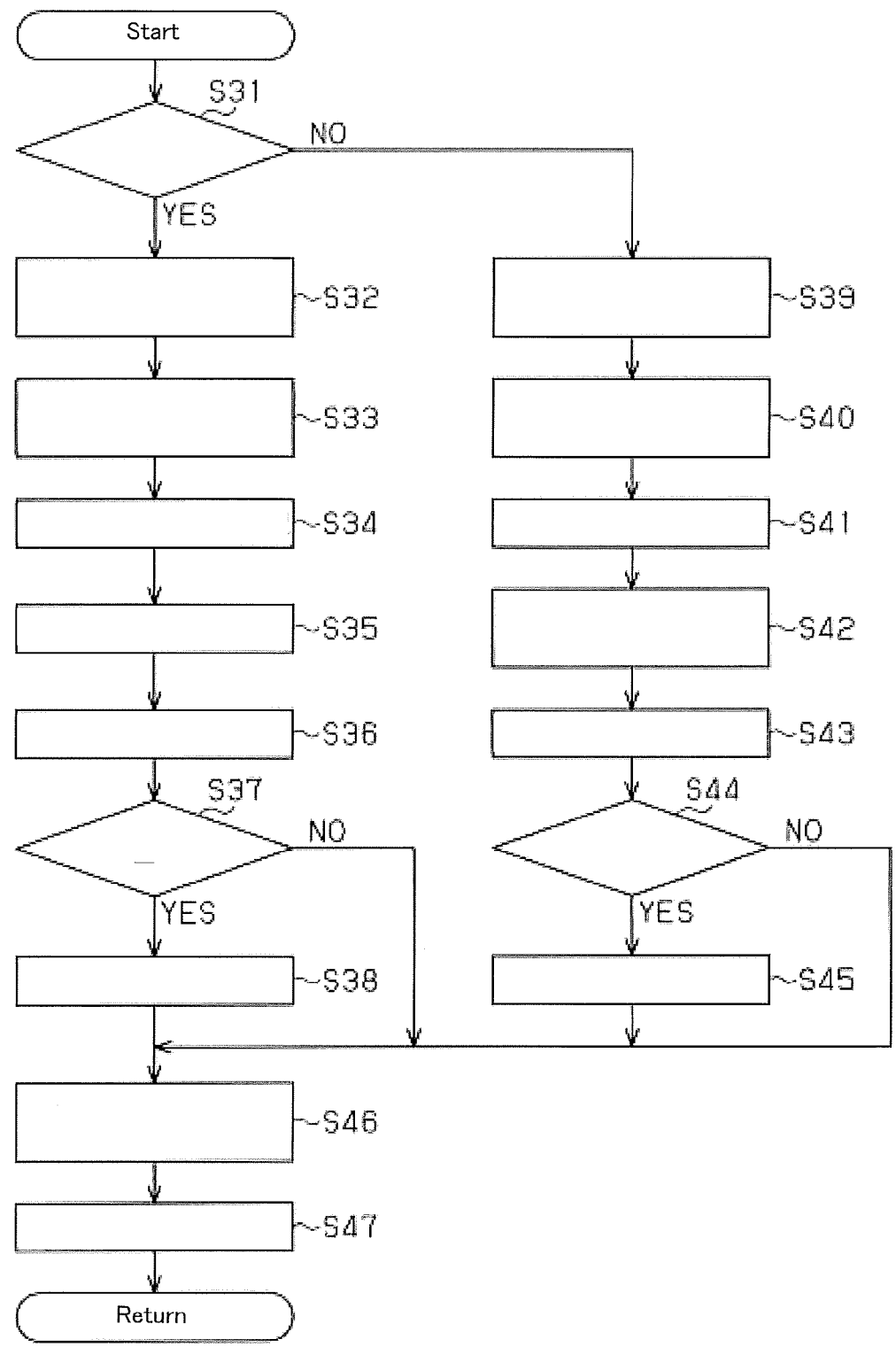
FIG. 14($a$) is an explanatory flowchart of processing routine executed by the ECU for setting of an indicated current value.
Figure 15:
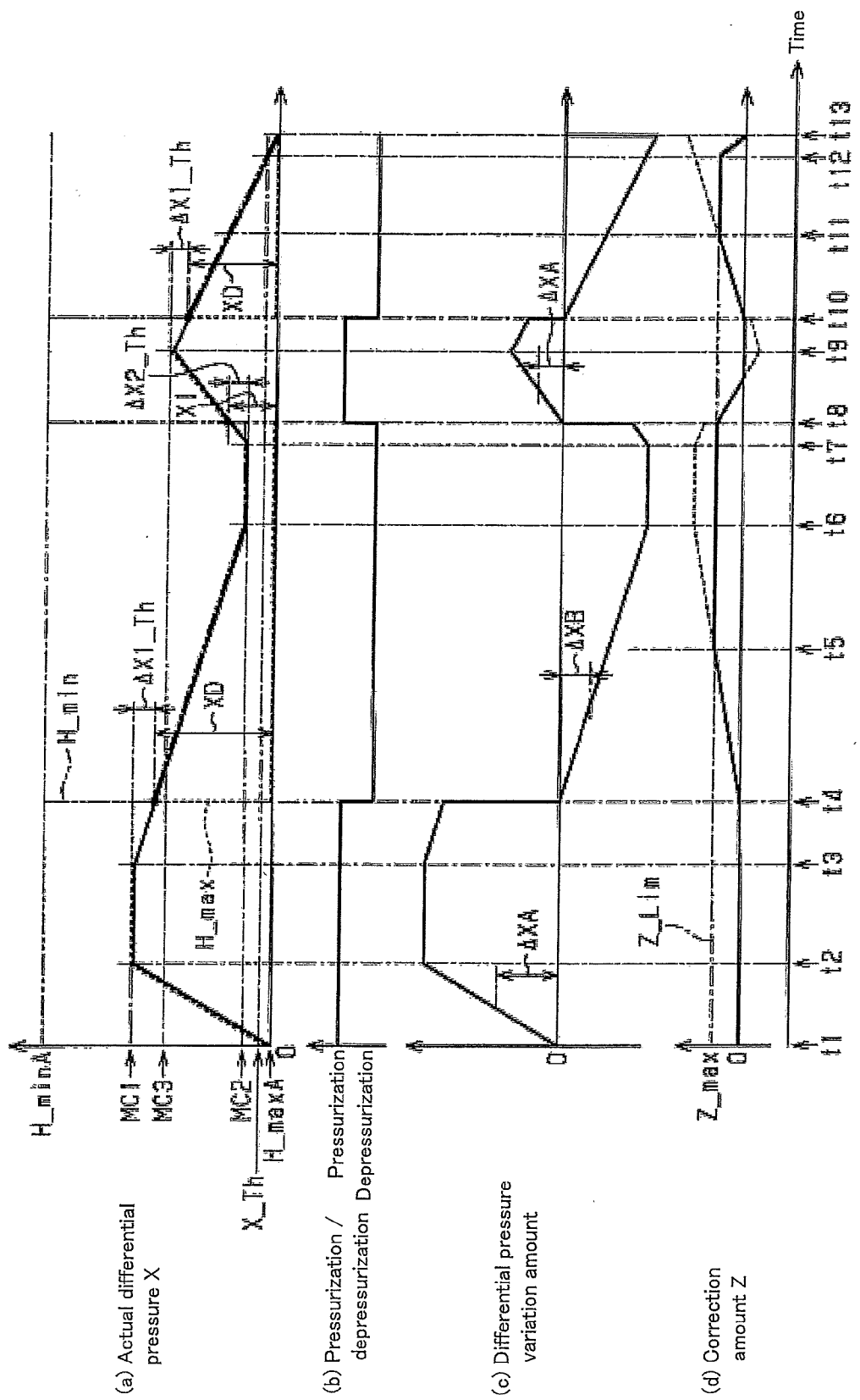
FIGS. 15($a$) to 15($d$) are timing charts of a case where the actual differential pressure is varied due to change of the required differential pressure, and FIG. 15($a$) indicates transition of the actual differential pressure, FIG. 15($b$) indicates transition between the pressurizing state and the depressurizing state, FIG. 15($c$) indicates transition of a differential pressure variation amount, and FIG. 15($d$) indicates transition of the correction amount.
Figure 16:
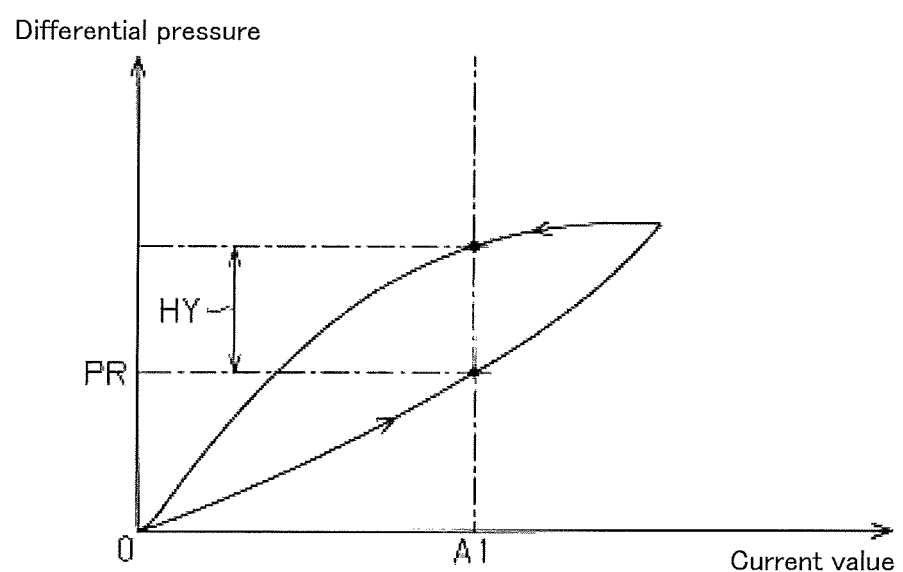
FIG. 16 is an explanatory graph of a hysteresis of a solenoid valve.

As depicted in FIGS. 14(*a*) and 14(*b*), in the present processing routine, the ECU 60 determines whether or not the depressurization determination flag FLG1 is ON (step S31). If the depressurization determination flag FLG1 is ON, the ECU 60 can determine that the pressurization determination flag FLG2 is OFF in the depressurizing state. In contrast, if the depressurization determination flag FLG1 is OFF, the ECU 60 can determine that the pressurization determination flag FLG2 is ON in the pressurizing state. If the depressurization determination flag FLG1 is ON (YES in step S31), the ECU 60 shifts the processing to subsequent step S32. In contrast, if the depressurization determination flag FLG1 is OFF (NO in step S31), the ECU 60 shifts the processing to step S39 to be described later.

In step S32, the ECU 60 subtracts the actual differential pressure X from the depressurization-starting differential pressure XD to obtain a differential pressure variation amount ΔXB. The ECU 60 subsequently reads out the brake fluid discharge amount Y from the pump 38 and the temperature TMP (step S33). In order to detect the brake fluid temperature TMP, the hydraulic circuits 311 and 312 may be each provided with a temperature sensor configured to detect a brake fluid temperature to adopt the temperature detected with the temperature sensor, or the brake fluid temperature may be estimated from a detection signal transmitted from a sensor provided to the vehicle and configured to detect an outside temperature.

The ECU 60 calculates the corrected slope of increase DRI (step S34). Specifically, the ECU 60 sets the slope of increase DIZ according to the depressurization-starting differential pressure XD with reference to the map in FIG. 5. Furthermore, the ECU 60 sets the first correction gain G1 according to the discharge amount Y with reference to the map in the graph in FIG. 11, and sets the second correction gain G2 according to the brake fluid temperature TMP with reference to the map in the graph in FIG. 12. The ECU 60 substitutes the slope of increase DIZ, the first correction gain G1, and the second correction gain G2, which have been set, in the relational expression (Equation 2) to obtain the corrected slope of increase DRI.

The ECU 60 subsequently multiplies the corrected slope of increase DRI calculated in step S34 by the differential pressure variation amount ΔXB calculated in step S32 to obtain the correction amount Z (step S35). Subsequently in step S36, the ECU 60 acquires the limiting value Z_Lim according to the present actual differential pressure X (see FIG. 5). The ECU 60 then determines whether or not the correction amount Z calculated in step S35 is not less than the limiting value Z_Lim acquired in step S37 (step S37). If the correction amount Z is less than the limiting value Z_Lim (NO in step S37), the ECU 60 shifts the processing to step S46 to be described later with no execution of the processing in step S38. In contrast, if the correction amount Z is not less than the limiting value Z_Lim (YES in step S37), the ECU 60 sets the correction amount Z to the limiting value Z_Lim (step S38) and shifts the processing to subsequent step S46. In this regard, the ECU 60 also functions as a "depressurizing correction amount setting unit" configured to set the correction amount referred to for correction of the indicated current value in accordance with the depressurization-starting differential pressure.

In step S39, the ECU 60 subtracts the pressurization-starting differential pressure XI from the actual differential pressure X to obtain a differential pressure variation amount ΔXA. The ECU 60 subsequently reads out the brake fluid discharge amount Y from the pump 38 and the temperature TMP (step S40). The ECU 60 calculates the corrected slope of decrease DRD (step S41). Specifically, the ECU 60 sets the reference slope of decrease DDZB to a value according to the pressurization-starting differential pressure XI with reference to the map in FIG. 10, and sets the third correction gain G3 to a value according to the pressurization-starting hysteresis amount HYI. The ECU 60 substitutes the reference slope of decrease DDZB and the third correction gain G3 in the relational expression (Equation 1) to obtain the slope of decrease DDZ. Furthermore, the ECU 60 sets the first correction gain G1 according to the discharge amount Y with reference to the map in the graph in FIG. 11, and sets the second correction gain G2 according to the brake fluid temperature TMP with reference to the map in the graph in FIG. 12. The ECU 60 substitutes the slope of decrease DDZ, the first correction gain G1, and the second correction gain G2, which have been set, in the relational expression (Equation 3) to obtain the corrected slope of decrease DRD.

The ECU 60 subsequently reads out a correction amount ZA at the time point when the actual differential pressure X ends decreasing, i.e. the time point when the actual differential pressure X starts increasing (step S42). This correction amount ZA has a value according to a "specified amount". In other words, the specified amount has a value obtained by converting the correction amount ZA to a current value. The ECU 60 then subtracts, from the correction amount ZA thus read out, the product obtained by multiplying the corrected slope of decrease DRD calculated in step S41 by the differential pressure variation amount ΔXA calculated in step S39 to obtain the correction amount Z (step S43). Specifically, when increasing the actual differential pressure X to the required differential pressure M with transition from the depressurizing state to the pressurizing state, the ECU 60 decreases the correction amount Z from the correction amount ZA at the pressurization start in accordance with the corrected slope of decrease DRD thus set.

The ECU 60 then determines whether or not the correction amount Z thus calculated is not more than "0 (zero)" (step S44). If the correction amount Z is larger than "0 (zero)" (NO in step S44), the ECU 60 shifts the processing to step S46 to be described later. In contrast, if the correction amount Z is not more than "0 (zero)" (YES in step S44), the ECU 60 sets the correction amount Z to "0 (zero)" (step S45) and shifts the processing to subsequent step S46. When increasing the actual differential pressure X, the correction amount Z is prevented from becoming less than "0 (zero)". In this regard, the ECU 60 according to the present embodiment also functions as a "pressurizing correction amount setting unit" configured to decrease the correction amount Z from the correction amount ZA at the pressurization start with the corrected slope of decrease DRD set in step S41.

In step S46, the ECU 60 subtracts the correction amount Z from the required differential pressure M being set to obtain the corrected required differential pressure MZ. The ECU 60 subsequently sets the indicated current value Ip to a value according to the corrected required differential pressure MZ calculated in step S46 with reference to the map indicated with the broken line in FIG. 2 (step S47). In this regard, the ECU 60 according to the present embodiment also functions as an "indicated-value-setting unit". The ECU 60 then ends the present processing routine.

Described next with reference to the timing charts in FIGS. 15(a) to 15(d) is an effect of adjusting the actual differential pressure. Assume that the brake fluid temperature TMP is the room temperature and the brake fluid discharge amount Y from the pump 38 upon adjustment of the actual differential pressure X is kept at first discharge amount Y1.

As indicated in FIG. 15(a), the required differential pressure M is set to a first required differential pressure MC1 at a first time point t1. At the first time point t1, the actual differential pressure X is "0 (zero)" and the differential pressure valve 32 and the pump 38 starts being driven. When increasing the actual differential pressure X from "0 (zero)" to the required differential pressure M (the first required differential pressure MC1 in this case), the indicated current value Ip is set to a value according to the required differential pressure M (the first required differential pressure MC1 in this case) with reference to the map MAP1 in FIG. 2 with no consideration of the hysteresis. The driving current value Id increases along with the indicated current value Ip thus changed, so that the actual differential pressure X is increased with a substantially constant slope. The hysteresis amount HY at the time point when the actual differential pressure X starts increasing is "0 (zero)". The correction amount Z is thus "0 (zero)" as indicated in FIG. 15(d).

At a second time point t2, the actual differential pressure X is increased to the required differential pressure M (i.e. the first required differential pressure MC1). From the second time point t2 to a third time point t3, the actual differential pressure X is kept at the required differential pressure M (i.e. the first required differential pressure MC1). As indicated in FIG. 15(c), the differential pressure increase amount ΔX2 thus gradually increases with elapse of time from the first time point t1 to the second time point t2, and is not changed from the second time point t2 to the third time point t3. As indicated in FIG. 15(b), from the first time point t1 to the third time point t3, the actual differential pressure X is not required to decrease in the pressurizing state with the pressurization determination flag FLG2 being kept ON.

At the third time point t3, the required differential pressure M is changed to a second required differential pressure MC2 smaller than the first required differential pressure MC1. The indicated current value Ip is then set to a value according to the second required differential pressure MC2 due to the required differential pressure M thus changed. This indicated current value Ip is regarded as the "reference indicated current value". The driving current value Id then starts decreasing along with the indicated current value Ip thus decreased. However, immediately after the driving current value Id starts decreasing, the differential pressure decrease amount ΔX1 having a value obtained by subtracting the actual differential pressure X from the maximum hold value H_max is less than the decrease determination value ΔX1_Th (NO in step S16). Accordingly, the differential pressure is not determined as having started decreasing and the pressurizing state continues (see FIGS. 15(a) and 15(b)).

At a fourth time point t4, the differential pressure decrease amount ΔX1 becomes not less than the decrease determination value ΔX1_Th (YES in step S16) and the pressurizing state transitions to the depressurizing state. In other words, the pressurization determination flag FLG2 is turned OFF and the depressurization determination flag FLG1 is turned ON (step S17). Furthermore, the actual differential pressure X at the fourth time point t4 is stored as the depressurization-starting differential pressure XD (step S18). From the fourth time point t4, the amount of decrease of the actual differential pressure X from the depressurization-starting differential pressure XD is calculated as the differential pressure variation amount ΔXB (step S32).

The correction amount Z is set when the pressurizing state transitions to the depressurizing state. Specifically, at the fourth time point t4, the slope of increase DIZ is set to a value according to the depressurization-starting differential pressure XD with reference to the map in FIG. 5. The first correction gain G1 is set to a value according to the brake fluid discharge amount Y from the pump 38, and the second correction gain G2 is set to a value according to the brake fluid temperature TMP. The slope of increase DIZ, the first correction gain G1, and the second correction gain G2, which have been set, are substituted in the relational expression (Equation 2) to obtain the corrected slope of increase DRI (step S34).

From the fourth time point t4 to a fifth time point t5, the product obtained by multiplying the corrected slope of increase DRI by the differential pressure variation amount ΔXB is less than the limiting value Z_Lim (the upper limit value Z_max in this case) (NO in step S37). The correction amount Z is thus increased continuously. However, at the fifth time point t5, the product obtained by multiplying the corrected slope of increase DRI by the differential pressure variation amount ΔXB becomes equal to the limiting value Z_Lim (the upper limit value Z_max in this case), and from the fifth time point t5, the product becomes larger than the limiting value Z_Lim as indicated with the broken line in FIG. 15(d) (YES in step S37). In other words, the actual differential pressure X as the differential pressure by the differential pressure valve 32 is decreasing within a depressurizing differential pressure area from the fourth time point t4 to the fifth time point t5. The actual differential pressure X then reaches the lower limit value in the depressurizing differential pressure area at the fifth time point t5. The correction amount Z becomes equal to the limiting value Z_Lim from the fifth time point t5.

From the fourth time point t4, the corrected required differential pressure MZ is obtained by subtracting the correction amount Z from the required differential pressure M (i.e. the second required differential pressure MC2) (step S46). The indicated current value Ip is set in accordance with the corrected required differential pressure MZ (step S47). Specifically, the indicated current value Ip is decreased from the reference indicated current value set at the third time point t3 with a slope according to the corrected slope of increase DRI. Along with the decreasing driving current value Id due to the decreasing indicated current value Ip, the actual differential pressure X is smoothly decreased to the required differential pressure M (i.e. the second required differential pressure MC2). At a sixth time point t6, the actual differential pressure X reaches the required differential pressure M (i.e. the second required differential pressure MC2) and is kept constant (see FIG. 15(a)). From the fourth time point t4 to a seventh time point t7, the actual differential pressure X is not required to increase in the depressurizing state with the depressurization determination flag FLG1 being kept ON (see FIG. 15(b)).

At the seventh time point t7, the required differential pressure M is changed to a third required differential pressure MC3 larger than the second required differential pressure MC2. The indicated current value Ip is then set to a value according to the third required differential pressure MC3 due to the required differential pressure M thus changed. This indicated current value Ip is regarded as the "reference indicated current value". The driving current value Id then starts increasing along with the indicated current value Ip thus increased. However, immediately after the driving current value Id starts increasing, the differential pressure increase amount ΔX2 being a value obtained by subtracting the minimum hold value H_min from the actual differential pressure X becomes less than the increase determination value ΔX2_Th (NO in step S22). Accordingly, the differential pressure is not determined as having started increasing and the depressurizing state continues (see FIGS. 15(a) and 15(b)).

At an eighth time point t8, the differential pressure increase amount ΔX2 becomes not less than the increase determination value ΔX2_Th (YES in step S22) and the depressurizing state transitions to the pressurizing state. In other words, the depressurization determination flag FLG1 is turned OFF and the pressurization determination flag FLG2 is turned ON (step S23). Furthermore, the actual differential pressure X at the eighth time point t8 is stored as the pressurization-starting differential pressure XI (step S24). From the eighth time point t8, the amount of increase of the actual differential pressure X from the pressurization-starting differential pressure XI is calculated as the differential pressure variation amount ΔXA (step S39).

The actual differential pressure X is in the state of restarting increase from the eighth time point t8. The pressurization-starting hysteresis amount HYI is larger than "0 (zero)" in this case. In the present embodiment, the slope of decrease DDZ is set at the eighth time point t8 in accordance with the pressurization-starting differential pressure XI and the pressurization-starting hysteresis amount HYI with reference to the relational expression (Equation 1). The slope of decrease DDZ, the first correction gain G1 according to the discharge amount Y, and the second correction gain G2 according to the brake fluid temperature TMP, are substituted in the relational expression (Equation 3) to obtain the corrected slope of decrease DRD (step S41).

From the eighth time point t8 to a ninth time point 9, the correction amount Z is obtained by subtracting, from the correction amount ZA at the eighth time point t8, the product obtained by multiplying the corrected slope of decrease DRD by the differential pressure variation amount ΔXA (step S43). The correction amount Z thus gradually decreases with the corrected slope of decrease DRD. If this correction amount Z is larger than "0 (zero)" (NO in step S44), the corrected required differential pressure MZ is obtained by subtracting the correction amount Z from the required differential pressure M (step S46). The indicated current value Ip is then set in accordance with the corrected required differential pressure MZ. Specifically, the indicated current value Ip is increased from the reference indicated current value set at the eighth time point t8 with a slope according to the corrected slope of decrease DRD. The driving current value Id then increases along with the indicated current value Ip thus changed.

If the correction amount Z becomes not more than "0 (zero)" (YES in step S44), the correction amount Z is kept at "0 (zero)". The corrected required differential pressure MZ becomes equal to the required differential pressure M (the third required differential pressure MC3 in this case). The indicated current value Ip thus becomes a value according to the required differential pressure M (i.e. the third required differential pressure MC3). Specifically, the actual differential pressure X as the differential pressure by the differential pressure valve 32 is increasing within a pressurizing differential pressure area from the eighth time point t8 to the time point when the correction amount Z reaches "0 (zero)". The actual differential pressure X then reaches the upper limit value in the pressurizing differential pressure area at the time point when the correction amount Z reaches "0 (zero)". In other words, the correction amount Z is kept at "0 (zero)" if the actual differential pressure X is increasing outside the pressurizing differential pressure area.

The actual differential pressure X thus increases with a substantially constant slope from the eighth time point t8. At a ninth time point t9, the actual differential pressure X reaches the required differential pressure M (i.e. the third required differential pressure MC3).

The required differential pressure M is changed from the third required differential pressure MC3 to "0 (zero)" at the ninth time point t9. In other words, the required differential pressure M is decreased. The indicated current value Ip is set to a value according to "0 (zero)". This indicated current value Ip is regarded as the "reference indicated current value". From the ninth time point t9, the driving current value Id is decreased along with the indicated current value Ip thus decreased, and the actual differential pressure X starts decreasing. At a tenth time point t10, the differential pressure decrease amount ΔX1 becomes not less than the decrease determination value ΔX1_Th and the pressurizing state transitions to the depressurizing state (see FIG. 15(b)). The corrected slope of increase DRI is obtained in accordance with the depressurization-starting differential pressure XD stored at the tenth time point t10 (step S34), and the correction amount Z is obtained in accordance with the corrected slope of increase DRI and the differential pressure variation amount ΔXB (step S35).

This correction amount Z gradually increases as the actual differential pressure X approaches to the required differential pressure M (i.e. "0 (zero)"). However, at an eleventh time point t11, the product obtained by multiplying the corrected slope of increase DRI by the differential pressure variation amount ΔXB reaches the limiting value Z_Lim (the upper limit value Z_max in this case) (YES in step S37). The correction amount Z is thus set to the limiting value Z_Lim (step S38).

The correction amount Z is subtracted from the required differential pressure M to obtain the corrected required differential pressure MZ (step S46). The driving current value Id is controlled in its decrease in accordance with the indicated current value Ip according to the corrected required differential pressure MZ. The indicated current value Ip is decreased with a slope according to the corrected slope of increase DRI that is calculated at the tenth time point t10. However, after a twelfth time point t12, the actual differential pressure X becomes less than the specified differential pressure X_Th. The limiting value Z_Lim thus decreases along with the actual differential pressure X thus decreased, as indicated with the dashed line in FIG. 15(d). In other words, the correction amount Z decreases along with the limiting value Z_Lim thus decreased. At a thirteenth time point t13, the actual differential pressure X reaches the required differential pressure M (i.e. "0 (zero)"), and differential pressure control ends. In other words, the pump 38 stops being driven.

The configurations and functions described above achieve the following effects.

(1) If the pressurizing state transitions to the depressurizing state while the actual differential pressure X is controlled, the indicated current value Ip to the differential pressure valve 32 is set in accordance with the depressurization-starting differential pressure XD. The indicated current value Ip is made smaller as the depressurization-starting differential pressure XD is larger, by the influence of the hysteresis. In view of the fact that the variation manner of the hysteresis amount HY changes depending on the level of the depressurization-starting differential pressure XD, the indicated current value Ip is set in accordance with the depressurization-starting differential pressure XD so as to preferably decrease the actual differential pressure X to the required differential pressure M.

(2) If the actual differential pressure X is decreased to the required differential pressure M in the depressurizing state, the correction amount Z is made larger as the depressurization-starting differential pressure XD is larger. The corrected required differential pressure MZ is calculated by subtracting the correction amount Z from the required differential pressure M. By setting the indicated current value Ip in accordance with the corrected required differential pressure MZ, the indicated current value Ip can be decreased with a slope according to the depressurization-starting differential pressure XD. The actual differential pressure X can thus be decreased smoothly to the required differential pressure M by decreasing the indicated current value Ip in this manner in the depressurizing state.

(3) If the correction amount Z calculated in accordance with the depressurization-starting differential pressure XD in the depressurizing state is too large, the corrected required differential pressure MZ and the indicated current value Ip may become too small. The actual differential pressure X may become much smaller than the required differential pressure M in this case. In view of this, the present embodiment does not allow the correction amount Z to become larger than the limiting value Z_Lim. The corrected required differential pressure MZ and the indicated current value Ip are thus restrained from becoming too small, so as to restrain the phenomenon that the actual differential pressure X is much smaller than the required differential pressure M.

(4) If the actual differential pressure X is small, the rate of decrease of the actual differential pressure X relative to decrease of the driving current value Id is high. Accordingly, if the actual differential pressure X is decreased, the slope of decrease of the hysteresis amount HY is steeper as the actual differential pressure X is smaller. In view of this, the limiting value Z_Lim is set to the upper limit value Z_max if the actual differential pressure X is not less than the specified differential pressure X_Th, whereas the limiting value Z_Lim is made smaller as the actual differential pressure X is smaller if the actual differential pressure X is less than the specified differential pressure X_Th. The limiting value Z_Lim can thus be set to an appropriate value according to the actual differential pressure X at the timing, and the correction amount Z can preferably be prevented from becoming too large. When decreasing the actual differential pressure X, it is possible to restrain the phenomenon that the actual differential pressure X is much smaller than the required differential pressure M, so as to control the actual differential pressure X highly accurately.

(5) In the present embodiment, the slope of increase DIZ (DIZ1 to DIZ3) is obtained in accordance with the depressurization-starting differential pressure XD, and the correction amount Z is calculated from the slope of increase DIZ. The correction amount Z can accordingly be increased in the depressurizing state with a slope according to the variation manner of the hysteresis amount at the timing. The indicated current value Ip can thus be decreased with a slope according to the variation manner of the hysteresis amount at the timing. The actual differential pressure X can be decreased smoothly to the required differential pressure M, in other words, can be decreased to the required differential pressure M with a substantially constant slope. This allows braking torque to each of the wheels FR and RL to gradually decrease.

(6) The slopes of increase DIZ1 to DIZ3 are provided for the differential pressure areas R11 to R13, respectively. It is thus possible to restrain increase of the control load of the ECU 60 in comparison to a case where the slope of increase DIZ is provided for each depressurization-starting differential pressure XD.

(7) In the present embodiment, the corrected slope of increase DRI is calculated by correcting the slope of increase DIZ, which is set in accordance with the depressurization-starting differential pressure XD, depending on the brake fluid discharge amount Y from the pump 38 at the timing. The correction amount Z is calculated from the corrected slope of increase DRI, and the corrected required differential pressure MZ and the indicated current value Ip are set in accordance with the correction amount Z. The actual differential pressure X can be controlled more accurately by determining the decreasing manner of the indicated current value Ip in consideration of the brake fluid discharge amount Y at the timing.

(8) In the present embodiment, the corrected slope of increase DRI is calculated by correcting the slope of increase DIZ, which is set in accordance with the depressurization-starting differential pressure XD, depending on the brake fluid temperature TMP at the timing. The correction amount Z is calculated from the corrected slope of increase DRI, and the corrected required differential pressure MZ and the indicated current value Ip are set in accordance with the correction amount Z. The actual differential pressure X can be controlled more accurately by determining the decreasing manner of the indicated current value Ip in consideration of the brake fluid temperature TMP at the timing.

(9) At transition from the depressurizing state to the pressurizing state, the pressurization-starting hysteresis amount HYI may be larger than "0 (zero)". The pressurization-starting differential pressure XI is also larger than "0 (zero)" in this case. The increasing manner of the indicated current value Ip is controlled in accordance with the pressurization-starting differential pressure XI so as to smoothly increase the actual differential pressure X to the required differential pressure M. Specifically, in the present embodiment, the corrected slope of decrease DRD is obtained in accordance with the pressurization-starting differential pressure XI. The product obtained by multiplying the corrected slope of decrease DRD by the differential pressure variation amount ΔXA is subtracted from the correction amount ZA at the time point when the differential pressure X starts increasing, so as to obtain the correction amount Z. The corrected required differential pressure MZ and the indicated current value Ip are set in accordance with the correction amount Z. The indicated current value Ip can be increased with a slope of increase according to the pressurization-starting differential pressure XI. The actual differential pressure X can thus be increased smoothly to the required differential pressure M. The actual differential pressure X can thus be preferably increased to the required differential pressure M by setting the corrected required differential pressure MZ and the indicated current value Ip in consideration of the pressurization-starting differential pressure XI when the actual differential pressure X is increasing.

(10) The corrected slope of decrease DRD is obtained in consideration of the pressurization-starting hysteresis amount HYI. The correction amount Z is obtained in accordance with the corrected slope of decrease DRD, and the corrected required differential pressure MZ and the indicated current value Ip are set in accordance with the correction amount Z. Controllability of the actual differential pressure X being increasing can be further improved by determining the increasing manner of the indicated current value Ip in consideration of the pressurization-starting differential pressure XI as well as the pressurization-starting hysteresis amount HYI.

(11) The corrected slope of decrease DRD is obtained also in consideration of the brake fluid discharge amount Y from the pump 38 at the timing. The correction amount Z is calculated from the corrected slope of decrease DRD, and the corrected required differential pressure MZ and the indicated current value Ip are set in accordance with the correction amount Z. The actual differential pressure X can thus be controlled more accurately.

(12) The corrected slope of decrease DRD is obtained also in consideration of the brake fluid temperature TMP at the timing. The correction amount Z is calculated from the corrected slope of decrease DRD, and the corrected required differential pressure MZ and the indicated current value Ip are set in accordance with the correction amount Z. The actual differential pressure X can thus be controlled more accurately.

(13) The correction amount Z is prevented from becoming less than "0 (zero)" in the pressurizing state. The corrected required differential pressure MZ can thus be prevented from becoming larger than the required differential pressure M. This can restrain the phenomenon that the actual differential pressure X is much larger than the required differential pressure M.

The embodiment described above can be modified into any one of the following different embodiments.

- If the generation manner or the variation manner of the hysteresis amount HY is hardly changed by the brake fluid temperature TMP, the corrected slope of decrease DRD can be obtained with no consideration of the brake fluid temperature TMP. It is possible to achieve an effect equivalent to the effect (9) or (10) also in this case by obtaining the corrected slope of decrease DRD in consideration of the pressurization-starting hysteresis amount HYI and the pressurization-starting differential pressure XI.
- If the generation manner or the variation manner of the hysteresis amount HY is hardly changed by the flow rate of brake fluid in each of the hydraulic circuits 311 and 312, the corrected slope of decrease DRD can be obtained with no consideration of the brake fluid discharge amount Y from the pump 38. It is possible to achieve an effect equivalent to the effect (9) or (10) also in this case by obtaining the corrected slope of decrease DRD in consideration of the pressurization-starting hysteresis amount HYI and the pressurization-starting differential pressure XI.
- The corrected slope of decrease DRD can be obtained with no consideration of the pressurization-starting differential pressure XI if the pressurization-starting hysteresis amount HYI is taken into consideration. It is possible to achieve an effect equivalent to the effect (10) also in this case.

For example, the corrected slope of decrease DRD is set to be gentler as the pressurization-starting hysteresis amount HYI is larger, regardless of the level of the pressurization-starting differential pressure XI. If the required differential pressure M is included in the pressurizing differential pressure area in the pressurizing state, the indicated current value Ip can be increased with a slope according to the pressurization-starting hysteresis amount HYI by decreasing the correction amount Z in accordance with the corrected slope of decrease DRD. The actual differential pressure X can thus be increased smoothly from the required differential pressure before being changed to a level close to the required differential pressure having been changed. The pressurizing differential pressure area in this case corresponds to the area between the pressurization-starting differential pressure XI and the boundary differential pressure that is obtained as the sum of the predetermined differential pressure according to the pressurization-starting hysteresis amount HYI and the pressurization-starting differential pressure XI. When the required differential pressure M having been changed reaches the upper limit value in the pressurizing differential pressure area, the correction amount Z reaches "0 (zero)".

If the required differential pressure M is larger than the upper limit value in the pressurizing differential pressure area even in the pressurizing state, the correction amount Z is decreased with the corrected slope of decrease DRD according to the pressurization-starting hysteresis amount HYI until the actual differential pressure X reaches the upper limit value in the pressurizing differential pressure area. In this case, the correction amount Z reaches "0 (zero)" when the actual differential pressure X reaches the upper limit value in the pressurizing differential pressure area. If the actual differential pressure X subsequently increases outside the pressurizing differential pressure area, the correction amount Z is kept at "0 (zero)". The indicated current value Ip is thus restrained from becoming larger than the reference indicated current value according to the required differential pressure M, so as to restrain the phenomenon that the actual differential pressure X is much larger than the required differential pressure M.

- The corrected slope of decrease DRD may be obtained with no consideration of the pressurization-starting hysteresis amount HYI if the pressurization-starting differential pressure XI is taken into consideration. It is possible to achieve an effect equivalent to the effect (9) also in this case.

For example, the corrected slope of decrease DRD is set to be gentler as the pressurization-starting differential pressure XI is smaller, regardless of the level of the pressurization-starting hysteresis amount HYI. If the required differential pressure M is included in the pressurizing differential pressure area in the pressurizing state, the indicated current value Ip can be increased with a slope according to the pressurization-starting differential pressure XI by decreasing the correction amount Z in accordance with the corrected slope of decrease DRD. The actual differential pressure X can thus be increased smoothly from the required differential pressure before being changed to a level close to the required differential pressure having been changed. The pressurizing differential pressure area corresponds to the area between the pressurization-starting differential pressure XI and the boundary differential pressure that is obtained as the sum of the predetermined differential pressure according to the pressurization-starting differential pressure XI and the pressurization-starting differential pressure XI. When the required differential pressure M having been changed reaches the upper limit value in the pressurizing differential pressure area, the correction amount Z reaches "0 (zero)".

If the required differential pressure M is larger than the upper limit value in the pressurizing differential pressure area even in the pressurizing state, the correction amount Z is decreased with the corrected slope of decrease DRD according to the pressurization-starting differential pressure XI until the actual differential pressure X reaches the upper limit value in the pressurizing differential pressure area. In this case, the correction amount Z reaches "0 (zero)" when the actual differential pressure X reaches the upper limit value in the pressurizing differential pressure area. If the actual differential pressure X subsequently increases outside the pressurizing differential pressure area, the correction amount Z is kept at "0 (zero)". The indicated current value Ip is thus restrained from becoming larger than the reference indicated current value according to the required differential pressure M, so as to restrain the phenomenon that the actual differential pressure X is much larger than the required differential pressure M.

If the generation manner or the variation manner of the hysteresis amount HY is hardly changed by the brake fluid temperature TMP, the corrected slope of increase DRI can be obtained with no consideration of the brake fluid temperature TMP. It is possible to achieve an effect equivalent to any of the effects (1) to (6) also in this case by obtaining the corrected slope of increase DRI in consideration of the depressurization-starting differential pressure XD.

If the generation manner or the variation manner of the hysteresis amount HY is hardly changed by the flow rate of brake fluid in each of the hydraulic circuits 311 and 312, the corrected slope of increase DRI can be obtained with no consideration of the brake fluid discharge amount Y from the pump 38. It is possible to achieve an effect equivalent to any of the effects (1) to (6) also in this case by obtaining the corrected slope of increase DRI in consideration of the depressurization-starting differential pressure XD.

If the slope of decrease DDZ can be made gentler as the pressurization-starting differential pressure XI is smaller, the slope of decrease DDZ can be set in accordance with any method other than the setting method according to the above embodiment. For example, assume that the slope of decrease of the case where the pressurization-starting differential pressure XI is the first differential pressure is a specified slope of decrease. If the pressurization-starting differential pressure XI is larger than the first differential pressure, the correction gain can be set to a value larger than "1" and the slope of decrease DDZ may be obtained by multiplying the specified slope of decrease by the correction gain. In contrast, if the pressurization-starting differential pressure XI is smaller than the first differential pressure, the correction gain can be set to a value smaller than "1" as well as larger than "0 (zero)" and the slope of decrease DDZ may be obtained by multiplying the specified slope of decrease by the correction gain. It is possible to achieve an effect equivalent to the effect (9) also in this case.

If the slope of increase DIZ can be made gentler as the depressurization-starting differential pressure XD is smaller, the slope of increase DIZ can be set in accordance with any method other than the setting method according to the above embodiment. For example, assume that the slope of increase of the case where the depressurization-starting differential pressure XD is the first differential pressure is a specified slope of increase. If the depressurization-starting differential pressure XD is smaller than the first differential pressure, the correction gain may be set to a value smaller than "1" (e.g. 0.9) and the slope of increase DIZ may be obtained by multiplying the specified slope of increase by the correction gain. In contrast, if the depressurization-starting differential pressure XD is larger than the first differential pressure, the correction gain may be set to a value larger than "1" (e.g. 1.2) and the slope of increase DIZ may be obtained by multiplying the specified slope of increase by the correction gain. It is possible to achieve an effect equivalent to the effect (5) also in this case.

A property stored in the ROM 62 functioning as a storage unit may be a map or a function indicating the relation between the driving current value Id and the actual differential pressure X of the case where the actual differential pressure X is decreased from a certain differential pressure to "0 (zero)". The property may alternatively be a map or a function indicating a property between a map or a function indicating the relation of the driving current value Id and the actual differential pressure X of the case where the actual differential pressure X is decreased from a certain differential pressure to "0 (zero)" and a map or a function indicating the relation of the driving current value Id and the actual differential pressure X of the case where the actual differential pressure X is increased from "0 (zero)".

The correction amount Z referred to for decreasing the actual differential pressure X can be set in accordance with any method other than the method according to the above embodiment. For example, a first correction amount is set to be a larger value as the depressurization-starting differential pressure XD is larger, a second correction amount is set in accordance with the brake fluid discharge amount Y from the pump 38, and a third correction amount is set in accordance with the brake fluid temperature TMP. The correction amount Z may be obtained as the sum of the first correction amount, the second correction amount, and the third correction amount. It is possible to achieve an effect equivalent to the effect (1) also in this case.

Additionally described below are technical concepts obtained from the above embodiment and different embodiments.

(A) In claim 8 or 9, the indicated-value-setting unit may be configured to correct the slope of increase of the indicated current value in accordance with the flow rate of brake fluid in the channel provided with the differential pressure valve.

The hysteresis amount is variable also depending on the flow rate of brake fluid in the channel. By correcting the slope of increase of the indicated current value in accordance with the flow rate of brake fluid in the channel, the slope of increase can be made approximate to the slope of decrease of the hysteresis amount at the timing. The above configuration can further improve controllability on an increasing differential pressure by increasing the indicated current value in accordance with the slope of increase.

(B) In claim 8 or 9, the indicated-value-setting unit may be configured to correct the slope of increase of the indicated current value in accordance with the brake fluid temperature in the channel provided with the differential pressure valve.

The hysteresis amount is variable also depending on the brake fluid temperature in the channel. By correcting the slope of increase of the indicated current value in accordance with the brake fluid temperature, the slope of increase can be made approximate to the slope of decrease of the hysteresis amount at the timing. The above configuration can further improve controllability on an increasing differential pressure by increasing the indicated current value in accordance with the slope of increase.

REFERENCE SIGNS LIST

22 . . . Master cylinder
32 . . . Differential pressure valve
50a, 50d . . . Wheel cylinder
60 . . . ECU as braking control device for vehicle (indicated-value-setting unit, depressurization-starting differential pressure acquisition unit, depressurizing correction amount setting unit, pressurization-starting differential pressure acquisition unit, and pressurizing correction amount setting unit)
62 . . . ROM exemplifying storage unit
DDZ . . . Slope of decrease DIZ . . . Slope of increase
DRD . . . Corrected slope of decrease
DRI . . . Corrected slope of increase
FR, RL . . . Wheel
HY . . . Hysteresis amount
HYI . . . Pressurization-starting hysteresis amount
Id . . . Driving current value
Ip . . . Indicated current value
M . . . Required differential pressure
MZ . . . Corrected required differential pressure
R11-R13, R21-R23 . . . Differential pressure area
TMP . . . Brake fluid temperature
X . . . Actual differential pressure
XD . . . Depressurization-starting differential pressure
XI . . . Pressurization-starting differential pressure
X_Th . . . Specified differential pressure
Y . . . Brake fluid discharge amount from pump
Z . . . Correction amount
ZA . . . Correction amount as pressurization-starting correction amount
Z_Lim . . . Limiting value
Z_max . . . Upper limit value

The invention claimed is:

1. A braking control device for vehicle comprising:
an electronic control unit configured to set an indicated current value to a differential pressure valve provided at a channel between a master cylinder and a wheel cylinder corresponding to a wheel, to a value according to a required differential pressure having a requirement value of a differential pressure by the differential pressure valve, and to acquire, as a depressurization-starting differential pressure, a differential pressure at transition from a pressurizing state of increasing the differential pressure by the differential pressure valve to a depressurizing state of decreasing the differential pressure by the differential pressure valve;
wherein when a depressurizing differential pressure area is set as an area between the depressurization-starting differential pressure acquired by the electronic control unit and a boundary differential pressure having a value obtained by subtracting a predetermined differential pressure according to the depressurization-starting differential pressure from the depressurization-starting differential pressure,
the electronic control unit sets a slope of decrease of the indicated current value, as an amount of decrease of the indicated current value relative to an amount of decrease of the required differential pressure, such that the smaller the depressurization-starting differential pressure is, the smaller the slope of decrease of the indicated current value is, when the required differential pressure is included in the depressurizing differential pressure area in the depressurizing state.

2. The braking control device for vehicle according to claim 1, wherein:
when the indicated current value according to the required differential pressure is set as a reference indicated current value, the electronic control unit sets a correction amount referred to for correction of the indicated current value in the depressurizing state, and
the electronic control unit sets the indicated current value in accordance with a value obtained by subtracting the correction amount from the reference indicated current value in the depressurizing state, and sets a slope of increase of the correction amount, as an amount of increase of the correction amount relative to the amount of decrease of the required differential pressure, such that the smaller the depressurization-starting differential pressure is, the smaller the slope of increase of the correction amount is, and increases the correction amount with the slope of increase, when the required differential pressure is included in the depressurizing differential pressure area in the depressurizing state, and
in a case where the required differential pressure is smaller than a lower limit value in the depressurizing differential pressure area in the depressurizing state, sets the slope of increase of the correction amount such that the smaller the depressurization-starting differential pressure is, the smaller the slope of increase of the correction amount is, and increases the correction amount with the slope of increase when the differential pressure by the differential pressure valve decreases in the depressurizing differential pressure area, and sets the correction amount to be equal to a limiting value when the differential pressure by the differential pressure valve decreases beyond the depressurizing differential pressure area.

3. The braking control device for vehicle according to claim 2, further comprising:
a storage unit configured to store a property indicating relation between a driving current value and the differential pressure of a case of increasing the value of driving current flowing to the differential pressure valve;
wherein the electronic control unit sets the reference indicated current value to be larger as the required differential pressure is larger in accordance with the property stored in the storage unit.

4. The braking control device for vehicle according to claim 3, wherein
the limiting value is set as an upper limit value when the differential pressure by the differential pressure valve is not less than a specified differential pressure, and
the limiting value is made smaller as the differential pressure by the differential pressure valve is smaller when the differential pressure is less than the specified differential pressure.

5. The braking control device for vehicle according to claim 2, wherein
the limiting value is set as an upper limit value when the differential pressure by the differential pressure valve is not less than a specified differential pressure, and
the limiting value is made smaller as the differential pressure by the differential pressure valve is smaller when the differential pressure is less than the specified differential pressure.

6. The braking control device for vehicle according to claim 2, wherein
the electronic control unit corrects the slope of decrease of the indicated current value in accordance with a flow rate of brake fluid in the channel provided with the differential pressure valve.

7. The braking control device for vehicle according to claim 2, wherein
the electronic control unit corrects the slope of decrease of the indicated current value in accordance with a brake fluid temperature in the channel provided with the differential pressure valve.

8. The braking control device for vehicle according to claim 2, wherein:
the electronic control unit is configured to acquire, as a pressurization-starting differential pressure, a differential pressure at transition from the depressurizing state to the pressurizing state; wherein when a pressurizing differential pressure area is set as an area between the pressurization-starting differential pressure and a boundary differential pressure having a value obtained by adding a predetermined differential pressure according to the pressurization-starting differential pressure to the pressurization-starting differential pressure, the electronic control unit sets a slope of increase of the indicated current value, as an amount of increase of the indicated current value relative to an amount of increase of the required differential pressure, such that the smaller the pressurization-starting differential pressure is, the smaller the slope of increase of the indicated current value is, when the required differential pressure is included in the pressurizing differential pressure area in the pressurizing state.

9. The braking control device for vehicle according to claim 8, wherein:

when the indicated current value according to the required differential pressure is set as a reference indicated current value, the electronic control unit sets a correction amount referred to for correction of the indicated current value in the pressurizing state, and the electronic control unit sets the indicated current value in accordance with a value obtained by subtracting the correction amount from the reference indicated current value in the pressurizing state, and sets a slope of decrease of the correction amount, as an amount of decrease of the correction amount relative to an amount of increase of the required differential pressure, such that the smaller the pressurization-starting differential pressure is, the smaller the slope of decrease of the correction amount is, and decreases the correction amount with the slope of decrease, when the required differential pressure is included in the pressurizing differential pressure area in the pressurizing state, and in a case where the required differential pressure is larger than an upper limit value in the pressurizing differential pressure area in the pressurizing state, sets the slope of decrease of the correction amount such that the smaller the pressurization-starting differential pressure is, the smaller the slope of decrease of the correction amount is, and decreases the correction amount with the slope of decrease when the differential pressure by the differential pressure valve increases in the pressurizing differential pressure area, and sets the correction amount to be equal to "0 (zero)" when the differential pressure by the differential pressure valve exceeds the upper limit value in the pressurizing differential pressure area.

10. The braking control device for vehicle according to claim 2, wherein:

the electronic control unit is configured to acquire, as a pressurization-starting differential pressure, a differential pressure at transition from the depressurizing state to the pressurizing state, and to acquire, as a pressurization-starting hysteresis amount, a hysteresis amount at transition from the depressurizing state to the pressurizing state; and wherein when a pressurizing differential pressure area is set as an area between the pressurization-starting differential pressure and a boundary differential pressure as a sum of a predetermined differential pressure according to the pressurization-starting hysteresis amount and the pressurization-starting differential pressure, the electronic control unit sets a slope of increase of the indicated current value, as an amount of increase of the indicated current value relative to an amount of increase of the required differential pressure, such that the larger the pressurization-starting hysteresis amount is, the smaller the slope of increase of the indicated current value is, when the required differential pressure is included in the pressurizing differential pressure area in the pressurizing state.

11. The braking control device for vehicle according to claim 10, wherein:

when the indicated current value according to the required differential pressure is set as a reference indicated current value, the electronic control unit sets a correction amount referred to for correction of the indicated current value in the pressurizing state, and the electronic control unit sets the indicated current value in accordance with a value obtained by subtracting the correction amount from the reference indicated current value in the pressurizing state, and sets a slope of decrease of the correction amount, as an amount of decrease of the correction amount relative to an amount of increase of the required differential pressure, such that the larger the pressurization-starting hysteresis amount is, the smaller the slope of decrease of the correction amount is, and decreases the correction amount with the slope of decrease, when the required differential pressure is included in the pressurizing differential pressure area in the pressurizing state, and in a case where the required differential pressure is larger than an upper limit value in the pressurizing differential pressure area in the pressurizing state, sets the slope of decrease of the correction amount such that the larger the pressurization-starting hysteresis amount is, the smaller the slope of decrease the correction amount is, and decreases the correction amount with the slope of decrease when the differential pressure by the differential pressure valve increases in the pressurizing differential pressure area, and sets the correction amount to be equal to "0 (zero)" when the differential pressure by the differential pressure valve exceeds the upper limit value in the pressurizing differential pressure area.

12. The braking control device for vehicle according to claim 1, wherein the electronic control unit is configured to set the slope of decrease of the indicated current value in accordance with a differential pressure area, and a slope of decrease of the indicated current value of a case where the depressurization-starting differential pressure is included in a first differential pressure area is smaller than a slope of decrease of the indicated current value of a case where the depressurization-starting differential pressure is included in a second differential pressure area as a higher pressure area than the first differential pressure area.

13. The braking control device for vehicle according to claim 1, wherein the electronic control unit corrects the slope of decrease of the indicated current value in accordance with a flow rate of brake fluid in the channel provided with the differential pressure valve.

14. The braking control device for vehicle according to claim 1, wherein the electronic control unit corrects the slope of decrease of the indicated current value in accordance with a brake fluid temperature in the channel provided with the differential pressure valve.

15. The braking control device for vehicle according to claim 1, wherein:
- the electronic control unit is configured to acquire, as a pressurization-starting differential pressure, a differential pressure at transition from the depressurizing state to the pressurizing state; wherein
- when a pressurizing differential pressure area is set as an area between the pressurization-starting differential pressure and a boundary differential pressure having a value obtained by adding a predetermined differential pressure according to the pressurization-starting differential pressure to the pressurization-starting differential pressure,
- the electronic control unit sets a slope of increase of the indicated current value, as an amount of increase of the indicated current value relative to an amount of increase of the required differential pressure, such that the smaller the pressurization-starting differential pressure is, the smaller the slope of increase of the indicated current value is, when the required differential pressure is included in the pressurizing differential pressure area in the pressurizing state.

16. The braking control device for vehicle according to claim 15, wherein:
- when the indicated current value according to the required differential pressure is set as a reference indicated current value, the electronic control unit sets a correction amount referred to for correction of the indicated current value in the pressurizing state, and
- the electronic control unit sets the indicated current value in accordance with a value obtained by subtracting the correction amount from the reference indicated current value in the pressurizing state, and sets a slope of decrease of the correction amount, as an amount of decrease of the correction amount relative to an amount of increase of the required differential pressure, such that the smaller the pressurization-starting differential pressure is, the smaller the slope of decrease of the correction amount is, and decreases the correction amount with the slope of decrease, when the required differential pressure is included in the pressurizing differential pressure area in the pressurizing state, and
- in a case where the required differential pressure is larger than an upper limit value in the pressurizing differential pressure area in the pressurizing state, sets the slope of decrease of the correction amount such that the smaller the pressurization-starting differential pressure is, the smaller the slope of decrease of the correction amount is, and decreases the correction amount with the slope of decrease when the differential pressure by the differential pressure valve increases in the pressurizing differential pressure area, and sets the correction amount to be equal to "0 (zero)" when the differential pressure by the differential pressure valve exceeds the upper limit value in the pressurizing differential pressure area.

17. The braking control device for vehicle according to claim 1, wherein:
- the electronic control unit is configured to acquire, as a pressurization-starting differential pressure, a differential pressure at transition from the depressurizing state to the pressurizing state, and to acquire, as a pressurization-starting hysteresis amount, a hysteresis amount at transition from the depressurizing state to the pressurizing state; and wherein
- when a pressurizing differential pressure area is set as an area between the pressurization-starting differential pressure and a boundary differential pressure as a sum of a predetermined differential pressure according to the pressurization-starting hysteresis amount and the pressurization-starting differential pressure,
- the electronic control unit sets a slope of increase of the indicated current value, as an amount of increase of the indicated current value relative to an amount of increase of the required differential pressure, such that the larger the pressurization-starting hysteresis amount is, the smaller the slope of increase of the indicated current value is, when the required differential pressure is included in the pressurizing differential pressure area in the pressurizing state.

18. The braking control device for vehicle according to claim 17, wherein:
- when the indicated current value according to the required differential pressure is set as a reference indicated current value, the electronic control unit sets a correction amount referred to for correction of the indicated current value in the pressurizing state, and
- the electronic control unit sets the indicated current value in accordance with a value obtained by subtracting the correction amount from the reference indicated current value in the pressurizing state, and sets a slope of decrease of the correction amount, as an amount of decrease of the correction amount relative to an amount of increase of the required differential pressure, such that the larger the pressurization-starting hysteresis amount is, the smaller the slope of decrease of the correction amount is, and decreases the correction amount with the slope of decrease, when the required differential pressure is included in the pressurizing differential pressure area in the pressurizing state, and
- in a case where the required differential pressure is larger than an upper limit value in the pressurizing differential pressure area in the pressurizing state, sets the slope of decrease of the correction amount such that the larger the pressurization-starting hysteresis amount is, the smaller the slope of decrease the correction amount is, and decreases the correction amount with the slope of decrease when the differential pressure by the differential pressure valve increases in the pressurizing differential pressure area, and sets the correction amount to be equal to "0 (zero)" when the differential pressure by the differential pressure valve exceeds the upper limit value in the pressurizing differential pressure area.

* * * * *